(12) United States Patent
Suenaga et al.

(10) Patent No.: US 7,940,086 B2
(45) Date of Patent: *May 10, 2011

(54) INTERFACE CIRCUIT THAT CAN SWITCH BETWEEN SINGLE-ENDED TRANSMISSION AND DIFFERENTIAL TRANSMISSION

(75) Inventors: Hiroshi Suenaga, Osaka (JP); Osamu Shibata, Hyogo (JP); Yoshiyuki Saito, Osaka (JP); Toru Iwata, Osaka (JP); Masayuki Toyama, Osaka (JP); Kyoko Hirata, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/847,161

(22) Filed: Jul. 30, 2010

(65) Prior Publication Data
US 2010/0289534 A1 Nov. 18, 2010

Related U.S. Application Data

(62) Division of application No. 12/262,613, filed on Oct. 31, 2008, now Pat. No. 7,843,224.

(30) Foreign Application Priority Data

Oct. 31, 2007 (JP) ................................. 2007-282564

(51) Int. Cl.
*H03K 19/094* (2006.01)

(52) U.S. Cl. ............................... 326/86; 326/87; 326/30
(58) Field of Classification Search .................. None
See application file for complete search history.

(56) References Cited

U.S. PATENT DOCUMENTS

| 6,836,290 B1 | 12/2004 | Chung et al. |
| 6,856,178 B1 | 2/2005 | Narayan |

FOREIGN PATENT DOCUMENTS

| JP | 2000-353035 | 12/2000 |
| WO | 99/55082 | 10/1999 |
| WO | 99/55083 | 10/1999 |

*Primary Examiner* — Rexford N Barnie
*Assistant Examiner* — Jany Tran
(74) *Attorney, Agent, or Firm* — Wenderoth, Lind & Ponack, L.L.P.

(57) ABSTRACT

An object of the present invention is to realize reduction in an area of an output stage driver in an interface circuit that switches between two transmission systems. The interface circuit has two driver circuits and a drive control circuit that can switch between two driving systems that are a voltage driving system and a current driving system. The two driver circuits are connected to a power supply potential via the drive control circuit. Two input signals and inverted logic signals of the input signals are inputted via a selection circuit. According to a control signal inputted into the drive control circuit, the interface circuit switches between the voltage-driving type single-ended transmission system and current driving type differential transmission system.

2 Claims, 22 Drawing Sheets

US 7,940,086 B2

INTERFACE CIRCUIT THAT CAN SWITCH BETWEEN SINGLE-ENDED TRANSMISSION AND DIFFERENTIAL TRANSMISSION

This application is a divisional of application Ser. No. 12/262,613, filed Oct. 31, 2008 now U.S. Pat. No. 7,843,224.

This application is based on an application No. 2007-282564 filed in Japan, the content of which is hereby incorporated by reference.

BACKGROUND OF THE INVENTION (1) Field of the Invention

The present invention relates to an interface circuit that can switch between a voltage driving push-pull type single-ended transmission system and a current driving type differential transmission system in an interface between machines and an interface between LSI's.

(2) Description of the Related Art

In recent years, processing speed of electronic devices has been continued to be improved in order to satisfy demands for multifunctional and high functional electronic devices. With the improvement, communication speed between the electronic devices has been enhanced. With the use of single-ended transmission having been conventionally and commonly used, it is difficult to realize high-speed communication between the electronic devices. Accordingly, in various types of transmission standard by which high-speed signal transmission is performed, such as LVDS (Low Voltage Differential transmission), USB (Universal Serial Bus) 2.0, IEEE 1394, HDMI (High-Definition Multimedia Interface) and Serial-ATA, a current driving type differential transmission system is employed in an interface of the electronic device.

In the field of a removable memory card, of which an SD memory card is a representative, currently the voltage driving type single-ended transmission system is employed as an interface with a host machine. However, it is necessary to apply the current driving type differential transmission system that enables high-speed input and output of data to a removable memory card whose storage capacity is increased with the development of technology.

However, if the current driving type differential transmission system is applied to a removable memory card, this removable memory card cannot be used in an electronic device that employs the already-available voltage driving type single-ended transmission system.

Therefore, there has been a demand for a removable memory card that can use both of the current driving type differential transmission system and the voltage driving type single-ended transmission system for data transmission. However, since the shape, the number of signals and terminals of a memory card are defined, besides the signal lines used for the already-available voltage driving type single-ended transmission system, the memory card cannot be provided with additional signal lines used for the current driving type differential transmission. Accordingly, signal lines and terminals of the memory card need to be shared for the use of both of the voltage driving type single-ended transmission system and the current driving type differential transmission type.

To solve the above problems, Patent Document 1 discloses a circuit that selectively uses the voltage driving type single-ended transmission and the current driving type differential transmission with the use of common signal lines. According to this technique disclosed by Patent Document 1, two output terminals of a single-ended driver are connected to two signal lines, respectively. Furthermore, the two signal lines are respectively connected to two output terminals of a differential driver. In addition, according to a transmission system control signal, the circuit switches between the single-ended driver and the differential driver for the operation. Herein, the transmission system control signal is a control signal indicating either of the single-ended transmission and the differential transmission.

[Patent Document 1] Japanese Unexamined Patent Application Publication No. 2000-353035

SUMMARY OF THE INVENTION

However, according to the above technique, it is necessary to keep an area for mounting the two drivers that are the single-ended driver and the differential driver. Accordingly, the above technique is not applicable to a device having a limited mounting area, such as a device having a prescribed shape. An example of such a device is a removable memory card.

For example, when the above technique is applied to a removable memory card, an area for mounting a flash memory thereon is reduced. This prevents the growth in storage capacity of the removable memory card. Hence, a differential driver circuit that is newly added to the removable memory card needs to have the minimum circuit area.

The object of the present invention is therefore to provide an interface circuit, a bidirectional interface circuit and a removable memory device that can use both the voltage driving type single-ended transmission system and the current driving type differential transmission system and that can be implemented in a small area.

To achieve the above object, in one embodiment of the present invention, an interface circuit that relays a signal between a first external circuit and a second external circuit selectively using a single-ended transmission system and a differential transmission system includes a signal reception unit operable to receive, from the first external circuit, a system signal indicating either of the single-ended transmission system and the differential transmission system, an input control circuit operable, (i) when the system signal indicates the single-ended transmission system, to receive a first data signal and a second data signal from the first external circuit, and to output the first data signal and the second data signal as a first input signal and a second input signal, respectively, and (ii) when the system signal indicates the differential transmission system, to receive a third data signal from the first external circuit, and to output the third data signal and an inverted logic signal of the third data signal as the first and the second input signals, respectively, a first driver circuit operable to receive the first input signal, to generate a first output signal based on the received first input signal, and to output the first output signal to the second external circuit; and a second driver circuit operable to receive the second input signal, to generate a second output signal based on the received second input signal, and to output the second output signal to the second external circuit.

Herein, the "first driver circuit" and the "second driver circuit" respectively correspond to driver circuits 200 and 201 shown in the undermentioned embodiments. The "system signal" corresponds to a transmission system control signal SE/DF shown in the undermentioned embodiments. The "first data signal" and the "third data signal" each correspond to an input signal XSIG1. The "second data signal" corresponds to an input signal XSIG2. The "first and the second input signals" correspond to signals respectively inputted to the driver circuits 200 and 201 in the undermentioned embodiments.

With the above configuration, the interface circuit can perform the voltage driving push-pull type single-ended transmission and the current driving push-pull type differential transmission using both the first and the second driver circuits. Thus, the interface circuit selectively uses the voltage driving type single-ended transmission and the current driving type differential transmission can be realized in a small area.

The interface circuit can perform the voltage driving push-pull type single-ended transmission and the current driving push-pull type differential transmission with the use of the same driver circuits. Accordingly, being free from load capacity of an output stage circuit or of an anti-electrostatic diode of the single-ended transmission circuit, the interface circuit can suppress deterioration of quality of a signal waveform during high-speed signal transmission.

The interface circuit further includes a drive control circuit operable to select a constant-voltage driving system or a constant-current driving system according to the system signal, and to control, according to the selection, voltage and current that are supplied from a power supply to the first and the second driver circuits. When the system signal indicates the single-ended transmission system, the first and the second driver circuits are driven by constant voltage, and when the system signal indicates the differential transmission system, the first and the second driver circuits are driven by constant current. In addition, the first driver circuit switches between conduction and non-conduction states of the current supplied from the power supply according to a level of the first input signal so as to generate the first output signal, and the second driver circuit switches between conduction and non-conduction states of the current according to a level of the second input signal so as to generate the second output signal.

With this configuration, these driver circuits can be driven using either of the voltage driving system and the current driving system.

The first and the second driver circuits are (i) each connected to the power supply via the drive control circuit and to a ground, or (ii) each connected to the ground via the drive control circuit and to the power supply. In addition, the drive control circuit includes a first control circuit and a second control circuit. In addition, the first and the second driver circuits are each connected to the power supply via the first control circuit and to a ground via the second control circuit.

With the above configuration, the drive control circuit can be mounted toward the power supply and/or the ground. For that reason, to design a device mounting the interface circuit therein, the drive control circuit may be arranged without much restraint, in view of arrangement with regard to other constituents and a standard with which the interface circuit is in compliant.

Furthermore, in the embodiment provided below, when the drive control circuit is configured with the use of the nMOS transistor as shown in FIG. 2, the interface circuit can be realized in an even smaller area than an interface circuit configured with the use of the pMOS transistor.

The interface circuit selects a first system in which current is supplied from an internal power supply and a second system in which current is supplied from an external power supply of the second external circuit via output paths being connected to the second external circuit. In the first system, the first and the second driver circuits switch between conduction and non-conduction states of current between the internal power supply and the second external circuit, and in the second system, the first and the second driver circuits switch between conduction and non-conduction states of current between the external power supply and a ground. In addition, the first and the second driver circuits are connected to the internal power supply via a switch circuit, and to the external power supply via output paths that output the first and the second output signals. In the second system, the switch circuit disconnects the first and the second driver circuits from the internal power supply, and the first and the second driver circuits switch between conduction and non-conduction states of the current by opening and blocking the output paths according to the levels of the first and the second input signals. In addition, the first and the second driver circuits are connected to the internal power supply and to the external power supply via the output paths that output the first and the second output signals. The first driver circuit includes a first switch circuit provided between the internal power supply and a first output terminal outputting the first output signal, and a second switch circuit provided between the first output terminal and the ground. The second driver circuit includes a third switch circuit provided between the internal power supply and a second output terminal outputting the second output signal, and a fourth switch circuit provided between the second output terminal and the ground. In the second system, the first switch circuit disconnects the first output terminal from the internal power supply, and the third switch circuit disconnects the second output terminal from the internal power supply, and the second switch circuit connects and disconnects the first terminal to and from the ground according to the level of the first input signal, and the fourth switch circuit connects and disconnects the second terminal to and from the ground according to the level of the second input signal.

With this configuration, the interface circuit can operate in the open-drain system that is operated in response to the current supply from the external power supply of the second external circuit.

As shown in the above configuration, the open-drain system can be realized in various circuit configurations.

The interface circuit further includes one or more delay control circuits provided in a preceding stage of either or both of the first and the second driver circuits.

Thus, with the delay control circuit, processing can be performed without delay among the constituents included in the interface circuit.

The signal reception unit further receives, from the first external circuit, a direction signal indicating a transmission direction. The interface circuit further includes a first signal line and a second signal line operable to establish connections between the first driver circuit and the second external circuit and between the second driver circuit and the second external circuit, respectively, an output control circuit operable to receive the first and the second input signals from the input control circuit, and (i) when the direction signal indicates the transmission direction from the first external circuit to the second external circuit, to output the first and the second input signals to the first and the second driver circuits, respectively, (ii) when the direction signal indicates the transmission direction from the second external circuit to the first external circuit, to disconnect the input control circuit from the second external circuit, a termination resistance circuit connected at one end to the first signal line and at another end to the second signal line, the termination resistance circuit having a given resistance value, a differential receiver circuit operable to receive differential signals from the second external circuit via the first and the second signal lines, a first single-ended receiver circuit operable to receive a single-ended signal from the second external circuit via the first signal line; and a second single-ended receiver circuit operable to receive a single-ended signal from the second external circuit via the second signal line. In addition, the interface circuit further includes a receiver switch circuit operable, when the direction signal indicates the transmission direction from the second external circuit to the first external circuit, to establish a connection between the drive control circuit and the differential receiver circuit, and to supply current from the drive control circuit to the differential receiver circuit.

With this configuration, the interface circuit can transmit and receive data using either of the differential transmission system and the single-ended transmission system. Accordingly, whichever systems the two external circuits may use, the interface circuit can relay a signal.

In another embodiment of the present invention, a removable memory device has an interface circuit that relays a signal between a first external circuit and a second external circuit selectively using a single-ended transmission system and a differential transmission system. The interface circuit includes a signal reception unit operable to receive, from the first external circuit, a system signal indicating either of the single-ended transmission system and the differential transmission system, an input control circuit operable, (i) when the system signal indicates the single-ended transmission system, to receive a first data signal and a second data signal from the first external circuit, and to output the first data signal and the second data signal as a first input signal and a second input signal, respectively, and (ii) when the system signal indicates the differential transmission system, to receive a third data signal from the first external circuit, and to output the third data signal and an inverted logic signal of the third data signal as the first and the second input signals, respectively, a first driver circuit operable to receive the first input signal, to generate a first output signal based on the received first input signal, and to output the first output signal to the second external circuit, and a second driver circuit operable to receive the second input signal, to generate a second output signal based on the received second input signal, and to output the second output signal to the second external circuit. In addition, in yet another embodiment of the present invention, a reconfigurable device has an interface circuit that relays a signal between a first external circuit and a second external circuit selectively using a single-ended transmission system and a differential transmission system. The interface circuit includes a signal reception unit operable to receive, from the first external circuit, a system signal indicating either of the single-ended transmission system and the differential transmission system, an input control circuit operable, (i) when the system signal indicates the single-ended transmission system, to receive a first data signal and a second data signal from the first external circuit, and to output the first data signal and the second data signal as a first input signal and a second input signal, respectively, and (ii) when the system signal indicates the differential transmission system, to receive a third data signal from the first external circuit, and to output the third data signal and an inverted logic signal of the third data signal as the first and the second input signals, respectively, a first driver circuit operable to receive the first input signal, to generate a first output signal based on the received first input signal, and to output the first output signal to the second external circuit, and a second driver circuit operable to receive the second input signal, to generate a second output signal based on the received second input signal, and to output the second output signal to the second external circuit.

With this configuration, the removable memory card can be used in both of a device being compliant with the differential transmission system and a device being compliant with the single-ended transmission system.

Furthermore, the reconfigurable device can be compliant with both of a device being compliant with the differential transmission system and a device being compliant with the single-ended transmission system.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

The following describes embodiments of the present invention, with reference to the attached drawings.

Embodiment 1

Figure 1:
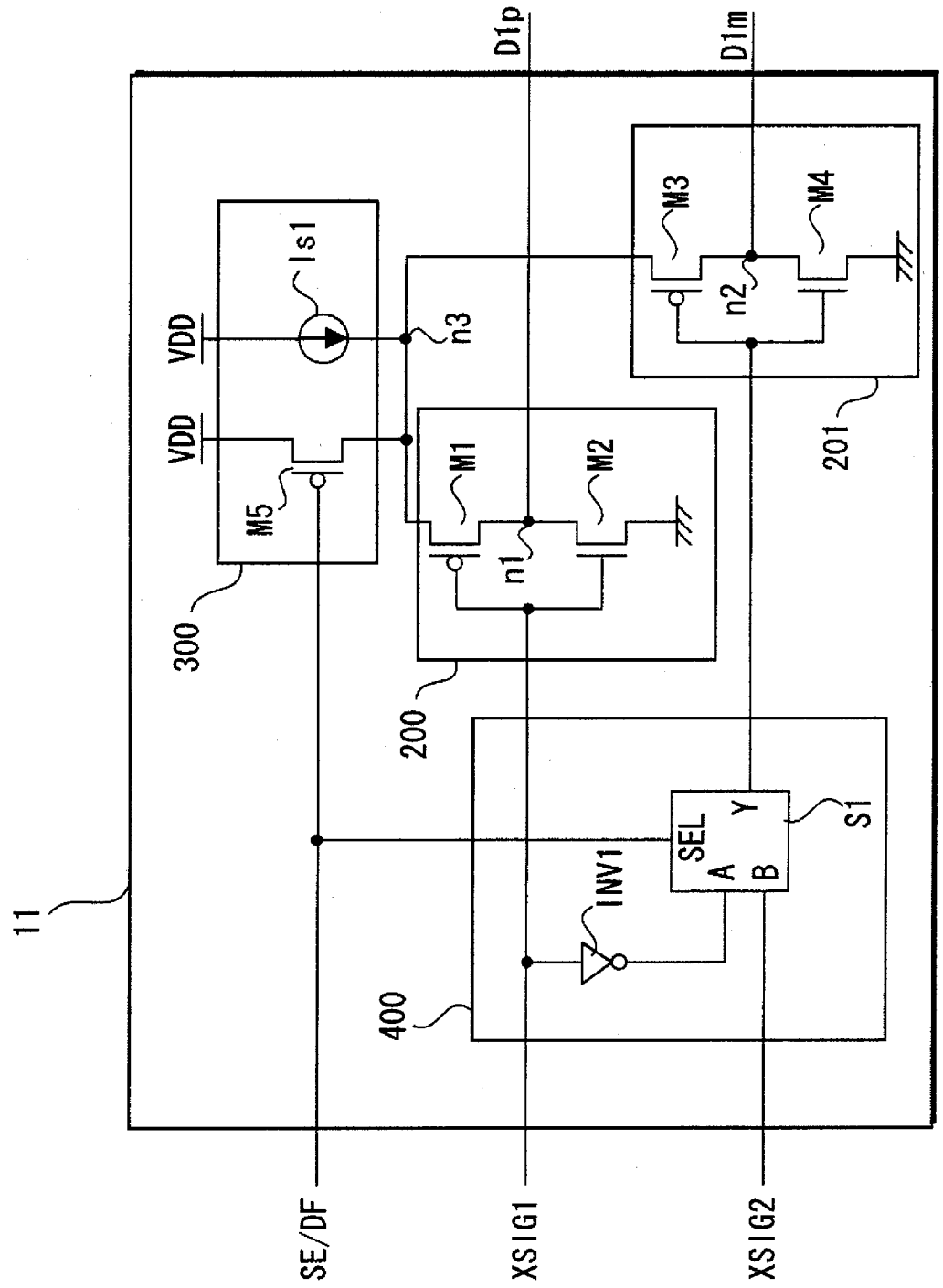
FIG. 1 is a diagram showing an example of a configuration of an interface circuit 11 in accordance with Embodiment 1 of the present invention.

(1) FIG. 1 shows an interface circuit 11 that can switch between voltage driving type single-ended transmission and current driving type differential transmission in accordance with Embodiment 1 of the present invention.

As shown in FIG. 1, the interface circuit 11 includes an input unit 203 that receives input of various signals, such as a control signal and a data signal, push-pull driver circuits 200 and 201, a drive control circuit 300, and an input control circuit 400 that controls input signals inputted to the driver circuits 200 and 201.

The input unit 203 has at least one input terminal and at least one signal line connected to the input terminal. In FIG. 1, three input terminals are provided, as an example. The three input terminals receive transmission system control signal SE/DF and input signals XSIG1 and XSIG2 from the outside. Herein, when the transmission system control signal SE/DF is "L (Low)," the voltage driving type single-ended transmission is indicated. When the transmission system control signal SE/DF is "H (High)," the current driving type differential transmission is indicated. The input signals XSIG1 and XSIG2 are signals including "L" and "H." The interface circuit 11 also includes two output terminals that are respectively connected to signal lines Dlp and Dlm.

The following describes each of circuits constituting the interface circuit 11.

The driver circuit 200 is constituted of transistors M1 and M2 and functions as a push-pull output stage circuit. An input node of the driver circuit 200 is connected, via the input control circuit 400, to an input terminal of the interface circuit 11 that receives the input signal XSIG1. An output node n1 of the driver circuit 200 is connected to the signal line Dlp via an output terminal of the interface circuit 11.

A gate of the pMOS transistor M1 is connected to the input node of the driver circuit 200. A source of the transistor M1 is connected to a circuit node n3 which is an output terminal of the drive control circuit 300. A drain of the transistor M1 is connected to a drain of the transistor M2 via the output node n1.

A gate of the nMOS transistor M2 is connected to the input node of the driver circuit 200. A drain of the transistor M2 is connected to a drain of the transistor M1 via the output node n1. A source of the transistor M2 is connected to a ground GND.

When the signal "L" is supplied to the input node of the driver circuit 200, current is conducted between the source and the drain of the transistor M1, and current is not conducted between the source and the drain of the transistor M2. Accordingly, current is conducted between a circuit node n3 and a circuit node n1, and a signal dependent on a power supply voltage VDD or a current supply circuit Is1 is supplied to the signal line Dlp.

On the other hand, when the signal "H" is supplied to the input node of the driver circuit 200, current is not conducted between the source and the drain of the transistor M1, and current is conducted between the source and the drain of the transistor M2. Accordingly, current is conducted between the ground GND and the circuit node n1, and a signal dependent on the ground GND is supplied to the signal line Dlp.

Since the driver circuit 201 has an identical configuration with the driver circuit 200, its detailed description is omitted. The driver circuit 201 is constituted of transistors M3 and M4 and functions as a push-pull output stage circuit. Herein, although the transistors M3 and M4 are respectively a pMOS transistor and an nMOS transistor, and respectively correspond to the transistors M1 and M2 of the driver circuit 200, for the sake of explanation, the transistors M3 and M4 are named thus. An input node of the driver circuit 201 is connected to an output terminal of the input control circuit 400. An output node n2 of the driver circuit 201 is connected to the signal line D1m via an output terminal of the interface circuit 11. A source of the transistor M3 is connected to the circuit node n3 that is an output terminal of the drive control circuit 300.

The drive control circuit 300 includes the pMOS transistor M5 and the current supply circuit Is1 that is connected to the power supply (potential VDD) and that controls output current. A source of the transistor M5 is connected to the power supply (VDD), and the gate of the transistor M5 is connected to an input terminal of the interface circuit 11 that receives the transmission system control signal SE/DF. A drain of the transistor M5 is connected to a circuit node n3 that is an output terminal of the drive control circuit 300.

The transmission system control signal SE/DF controls the conduction state between the source and the drain of the transistor M5. Thus, the drive control circuit 300 can have the driver circuits 200 and 201 selectively operated by the voltage driving system and the current driving system.

When the transmission system control signal SE/DF is "L," the current is conducted between the source and the drain of the transistor M5. On the other hand, when the transmission system control signal SE/DF is "H," the current is not conducted between the source and the drain of the transistor M5.

Herein, the resistance (ON resistance) of conducting current between the source and the drain of the transistor M5 is much lower than those of the transistors M1, M2, M3 and M4.

The input control circuit 400 includes a selection circuit S1 and a logic inversion circuit INV1. The input control circuit 400 receives the input signals XSIG1 and XSIG2 from the outside via the input terminals of the interface circuit 11 and controls output of the input signals XSIG1 and XSIG2 to the driver circuits. More specifically, the input control circuit 400 outputs the input signal XSIG1 as it is to the driver circuit 200. According to the transmission system control signal SE/DF, the selection circuit S1 selectively outputs an inverted logic signal of the input signal XSIG1 or the input signal XSIG2 to the driver circuit 201. In other words, when the transmission system control signal SE/DF is "L," which indicates the single-ended transmission, the selection circuit S1 selects the input signal XSIG2 and outputs the selected input signal XSIG2 to the driver circuit 201. On the other hand, when the transmission system control signal SE/DF is which indicates the differential transmission, the selection circuit S1 selects the inverted logic signal of the input signal XSIG1 outputted by the logic inversion circuit INV1 and outputs the inverted logic signal to the driver circuit 201.

The following describes operation of the interface circuit 11 when the interface circuit 11 performs the voltage driving push-pull type single-ended transmission and the current driving push-pull type differential transmission.

(When the Interface Circuit 11 is Operated with the Use of the Voltage Driving Push-Pull Type Single-Ended Transmission System)

When the interface circuit 11 performs the voltage driving push-pull type single-ended transmission, the transmission system control signal SE/DF is "L."

When the transmission system control signal SE/DF is "L," current is conducted between the source and the drain of the transistor M5. As described above, since the ON resistance of the transistor M5 is sufficiently low, the electric potential of the node 3 is almost equal to an electric power supply potential VDD. As a result, the current supply circuit Is1 does not supply constant current. Accordingly, voltage almost equal to the electric power supply potential VDD is supplied to the driver circuits 200 and 201. The driver circuits 200 and 201 output signals to the signal lines Dip and Dim with the use of the voltage driving system. As described above, the input signal XSIG1 is supplied to the driver circuit 200. In addition, since the transmission system control signal SE/DF is "L," the selection circuit S1 selects the input signal XSIG2, and outputs the selected input signal XSIG2 to the driver circuit 201.

Thus, the interface circuit 11 outputs the input signal XSIG1 from the driver circuit 200 to the signal line D1p with the use of the voltage driving system, and outputs the input signal XSIG2 from the driver circuit 201 to the signal line D1m.

Thus, the interface circuit 11 functions as a two-channel interface circuit operated using the voltage driving push-pull type single-ended transmission.

(When the Interface Circuit 11 is Operated with the Use of the Current Driving Type Differential Transmission System)

When the interface circuit 11 performs the current driving type differential transmission, the transmission system control signal SE/DF is "H."

When the transmission system control signal SE/DF is "H," current is not conducted between the source and the drain of the transistor M5. Accordingly, constant current is supplied from the current supply circuit Is1 to the driver circuits 200 and 201. The driver circuits 200 and 201 output signals to the signal lines D1p and D1m with the use of the current driving push-pull system.

As described above, the input signal XSIG1 is supplied to the driver circuit 200. In addition, since the transmission system control signal SE/DF is "H," the selection circuit S1 selects the inverted logic signal of the input signal XSIG1, and outputs the selected inverted logic signal to the driver circuit 201.

Thus, the interface circuit 11 outputs the input signal XSIG1 from the driver circuit 200 to the signal line D1p, and outputs the inverted logic signal of the input signal XSIG1 from the driver circuit 201 to the signal line D1m. Thus, the interface circuit 11 functions as a one-channel output circuit using the current driving push-pull type differential transmission.

With the above configuration, the interface circuit 11 is able to perform both the voltage driving push-pull type single-ended transmission and the current driving push-pull type differential transmission with the use of the driver circuits 200 and 201. Thus, output stage circuits of single-ended transmission and differential transmission are integrated, which is effective in reducing the circuit area. In addition, being free from load capacity of an unnecessary output stage circuit, the interface circuit 11 can suppress deterioration of quality of a signal waveform during high-speed signal transmission.

(2) Subsequently, the following describes an interface circuit 11a which is a modification of the interface circuit 11, with the reference to FIG. 2.

The interface circuit 11a includes a drive control circuit 301 instead of the drive control circuit 300 of the interface circuit 11. The interface circuit 11a includes the driver circuits 200 and 201, the drive control circuit 301, a logic inversion circuit INV2 and the input control circuit 400.

Each configuration of the driver circuits 200 and 201 and the input control circuit 400 of the interface circuit 11a are substantially identical with that of the driver circuits 200 and 201 and the input control circuit 400 of the interface circuit 11, respectively. Accordingly, detailed descriptions thereof are omitted. The following is a description mainly on differences between the interface circuits 11 and 11a.

Figure 2:
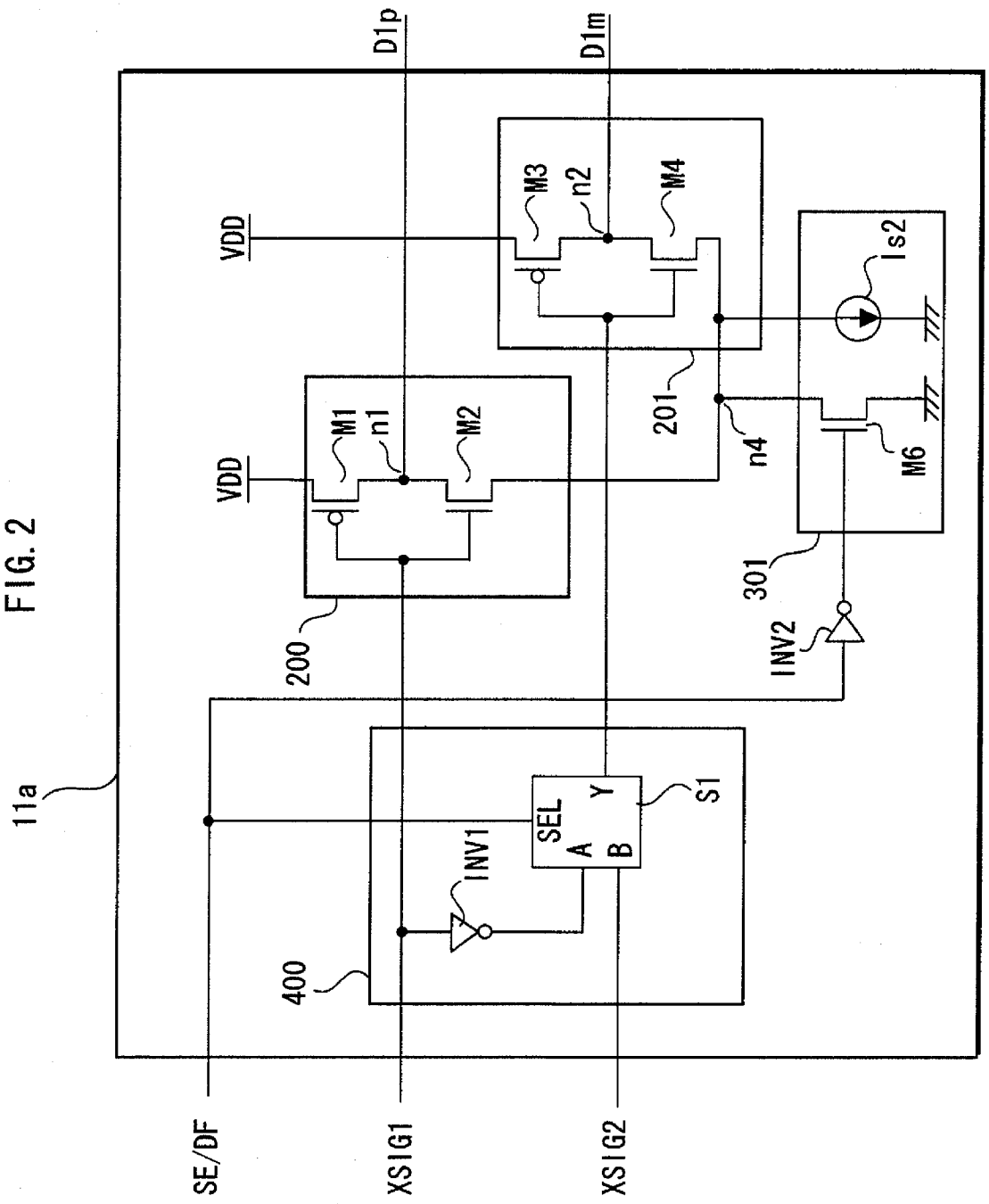
FIG. 2 is a diagram showing an example of a configuration of an interface circuit 11a in accordance with Embodiment 1 of the present invention.

As shown in FIG. 2, the driver circuits 200 and 201 are, connected to a ground (potential Vss) via the drive control circuit 301. The drive control circuit 301 is composed of a current supply circuit Is2 that controls the output current and an MOS transistor M6.

The source of the transistor M1 of the driver circuit 200 and the source of the transistor M3 of the driver circuit 201 are each connected to the power supply (VDD). The source of the transistor M2 of the driver circuit 200 and the source of the transistor M4 of the driver circuit 201 are each connected to the circuit node n4.

In addition, in the interface circuit 11a, an input terminal that receives the transmission system control signal SE/DF is connected to a gate of the transistor M6 included in the drive control circuit 301 via the logic inversion circuit INV2. A drain of the transistor M6 is connected to the circuit node n4. A source of the transistor M6 is connected to the ground GND.

Furthermore, the input terminal of the current supply circuit Is2 is connected to the circuit node n4, and the output terminal of the current supply circuit Is2 is connected to the ground GND.

The transmission system control signal SE/DF controls the conduction state between the source and the drain of the transistor M6. Thus, the drive control circuit 301 can drive the driver circuits 200 and 201 with selective use of the voltage driving system and the current driving system.

When the transmission system control signal SE/DF is "L," "H" is supplied to the gate of the transistor M6, and current is conducted between the source and the drain of the transistor M6. On the other hand, when the transmission system control signal SE/DF is "H," "L" is supplied to the gate of the transistor M6, and current is not conducted between the source and the drain of the transistor M6. When current is conducted between the source and the drain of the transistor M6, the potential of the node n4 is almost equal to the ground potential Vss. Accordingly, the current supply circuit Is2 does not supply constant current, and the driver circuits 200 and 201 are driven using the voltage driving system. On the other hand, when current is not conducted between the source and the drain of the transistor M6, the current supply circuit Is2 supplies constant current and the driver circuits 200 and 201 are driven using the current driving system.

The interface circuit 11 shown in FIG. 1 connects the driver circuits 200 and 201 to the power supply potential VDD via the drive control circuit 300. In general, when the ON resistance of the nMOS transistor is identical with that of the pMOS transistor, the nMOS transistor can be realized in a smaller area than the pMOS transistor. Accordingly, in addition to the effect created by the interface circuit 11 shown in FIG. 1, the interface circuit 11a shown in FIG. 2 can be realized in a smaller area.

Figure 3:
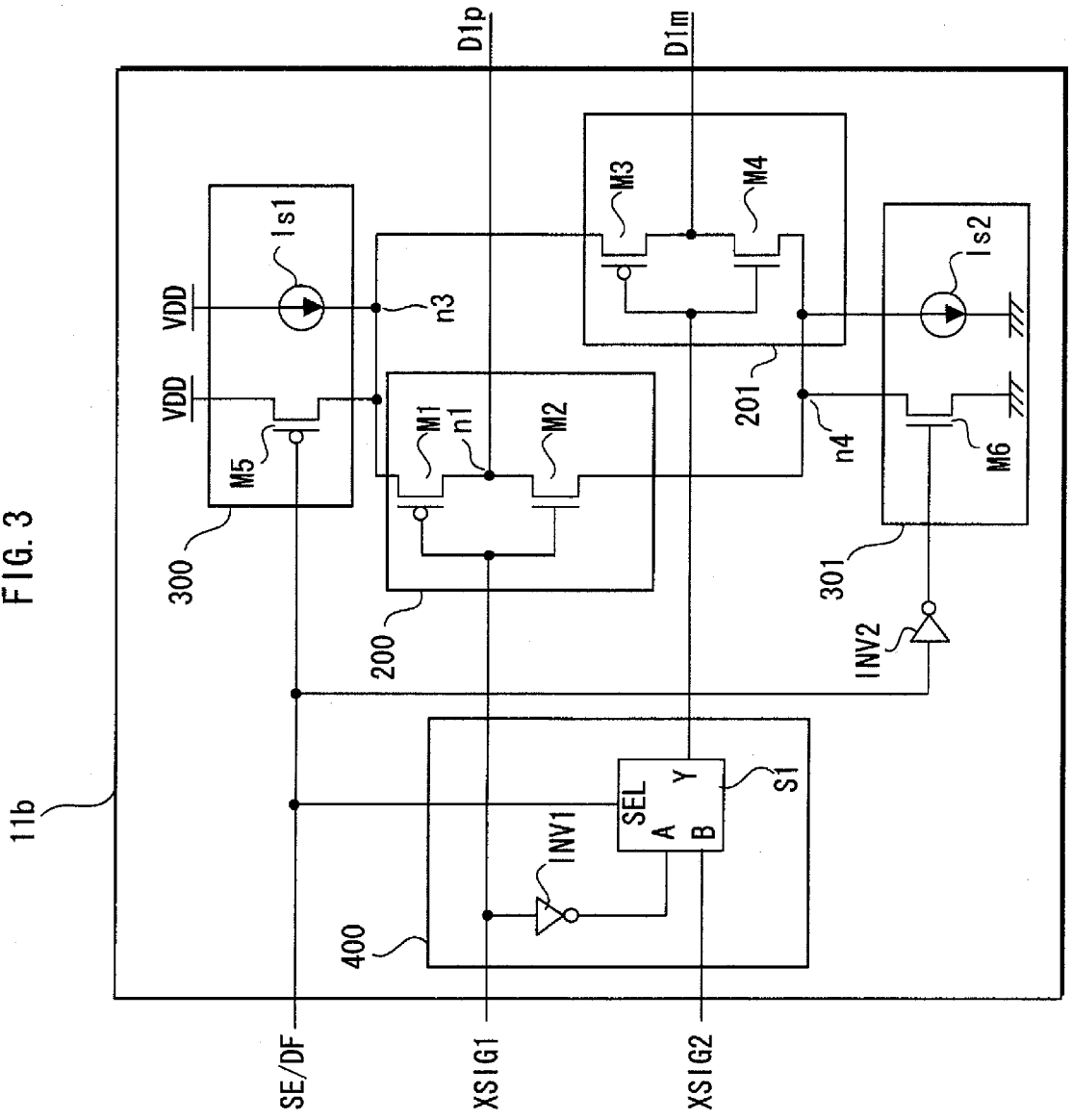
FIG. 3 is a diagram showing an example of a configuration of an interface circuit 11b in accordance with Embodiment 1 of the present invention.

(3) Subsequently, FIG. 3 shows a configuration example of an interface circuit 11b in accordance with the present invention. The interface circuit 11b is compliant with a transmission standard defining a midpoint potential of a differential signal to be half of the power supply potential VDD. An example of such a transmission standard is LVDS (Low Voltage Differential Signaling).

Besides the constituents of the interface circuit 11, the interface circuit 11b further includes the drive control circuit 301 and the logic inversion circuit INV2 of the interface circuit 11a.

With this configuration, the driver circuits 200 and 201 are connected to the power supply (VDD) via the drive control circuit 300, and the driver circuits 200 and 201 are connected to the ground (Vss) via the drive control circuit 301.

As described above, it is desirable that the ON resistances of the transistors M5 and M6 are sufficiently low. It is also desirable that the current driving capability and the ON resistances of the current supply circuits Is1 and Is2 are substantially equal to each other. With this configuration, the midpoint potential of the differential signal outputted by the interface circuit 11b is half of the power supply potential VDD.

With the configuration shown in FIG. 3, in the interface circuit 11b that can switch between the voltage driving push-pull type single-ended transmission and the LVDS differential transmission, the voltage driving push-pull type single-ended transmission and the LVDS differential transmission can be implemented in the same driver circuits. Thus, the interface circuit 11b can suppress quality deterioration of a signal waveform during high-speed signal transmission.

Note that although herein the drive control circuits 300 and 301 are separate, one drive control circuit may be composed of the two drive control circuits.

Figure 4:
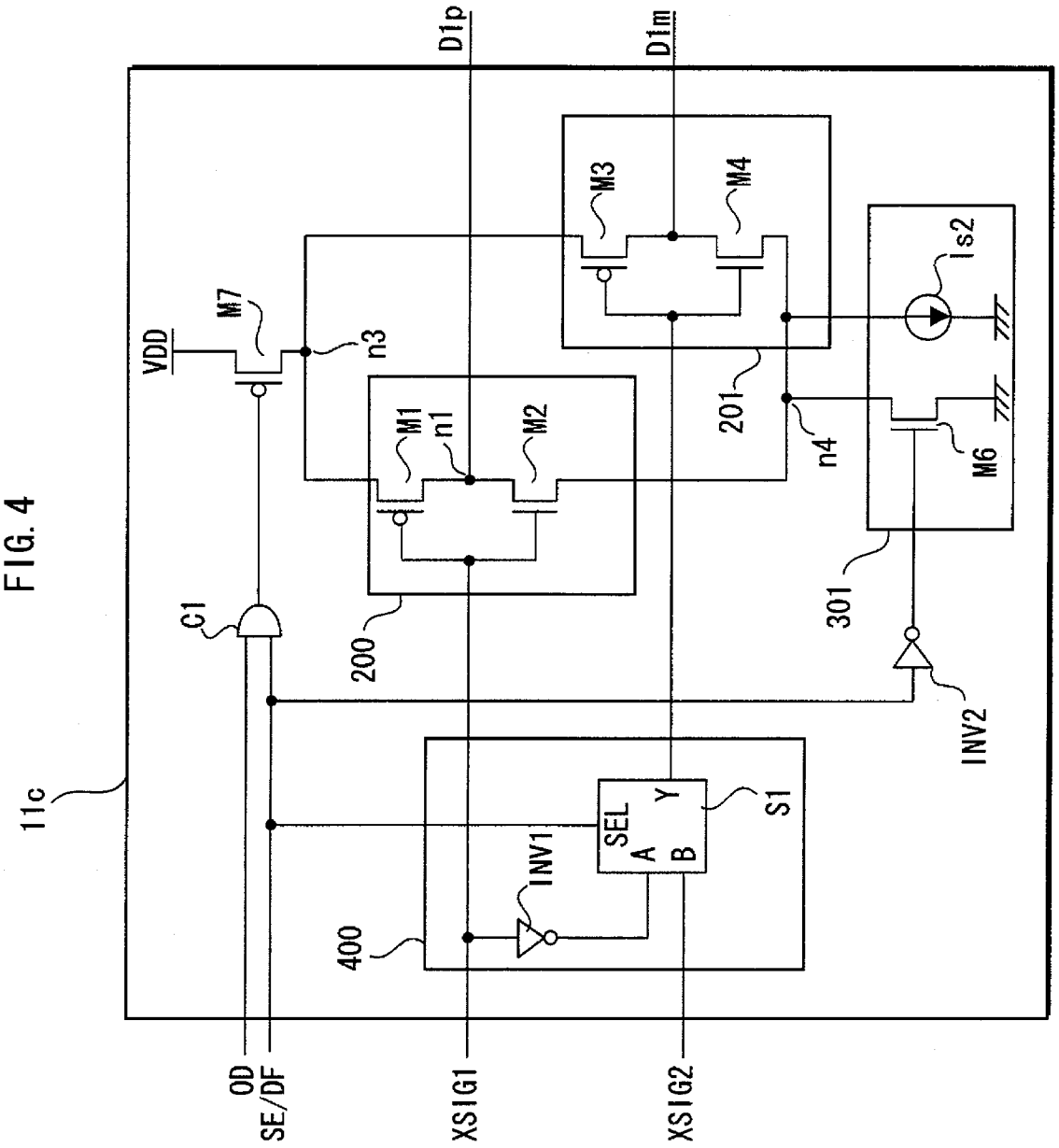
FIG. 4 is a diagram showing an example of a configuration of an interface circuit 11c in accordance with Embodiment 1 of the present invention.

(4) Subsequently, FIG. 4 shows an interface circuit 11c. The interface circuit 11c is shown as an example of a configuration that is also compliant with the open-drain type differential transmission standard, such as HDMI.

The interface circuit 11c has an identical configuration with the interface circuit 11b. Instead of the drive type control circuit 300 of the interface circuit 11b, the interface circuit 11c includes a pMOS transistor M7 and an AND circuit C1, and further receives an open-drain system control signal OD via an input terminal from the outside. The open-drain system control signal OD being "H" indicates that control using the open-drain system is performed. On the other hand, when the open-drain system control signal OD being "L" indicates that control using the open-drain system is not performed.

The AND circuit C1 performs AND operation to the open-drain system control signal OD and the transmission system control signal SE/DF, and outputs a signal obtained by the AND operation to the gate of the transistor M7. The source of the transistor M7 is connected to the voltage potential VDD. The drain of the transistor M7 is connected to the circuit node n3.

When the open-drain type differential transmission is performed in FIG. 4, the transmission system control signal SE/DF is "H," and current is not conducted between the source and the drain of the transistor M6. In addition, the open-drain system control signal OD is "H," and current is not conducted between the source and the drain of the transistor M7. In this condition, the current supply circuit Is2 is operated to draw current from the power supply (VDD) of the host machine via a pull-up resistor (unshown). The host machine is connected to the interface circuit 11c via the signal lines D1p and D1m, and includes the power supply and the pull-up resistor. The pull-up resistor is connected to the power supply (VDD) and the signal lines D1p and D1m. Thus, the interface circuit 11c is able to perform the open-drain type differential transmission.

When the transmission system control signal SE/DF is "H," and when the open-drain system control signal OD is "L," current is conducted between the source and the drain of the transistor M7. Thus, similarly to the interface circuit 11a shown in FIG. 2, the interface circuit 11c is able to perform the current driving push-pull type differential transmission.

When the transmission system control signal SE/DF is "L," current is conducted between the source and the drain of the transistor M6. Regardless of the open-drain system control signal OD, current is conducted between the source and the drain of the transistor M7. Thus, the interface circuit 11c is able to perform the voltage driving push-pull type single-ended transmission.

With the configuration of the interface circuit 11c shown in FIG. 4, the interface circuit 11c is able to perform all of the voltage driving push-pull type single-ended transmission, the current driving push-pull type differential transmission and the current driving open-drain type differential transmission with the use of the driver circuits 200 and 201. Thus, being free from load capacity of an unnecessary output stage circuit, the interface circuit 11c can suppress quality deterioration of a signal waveform during high-speed signal transmission.

Figure 5:
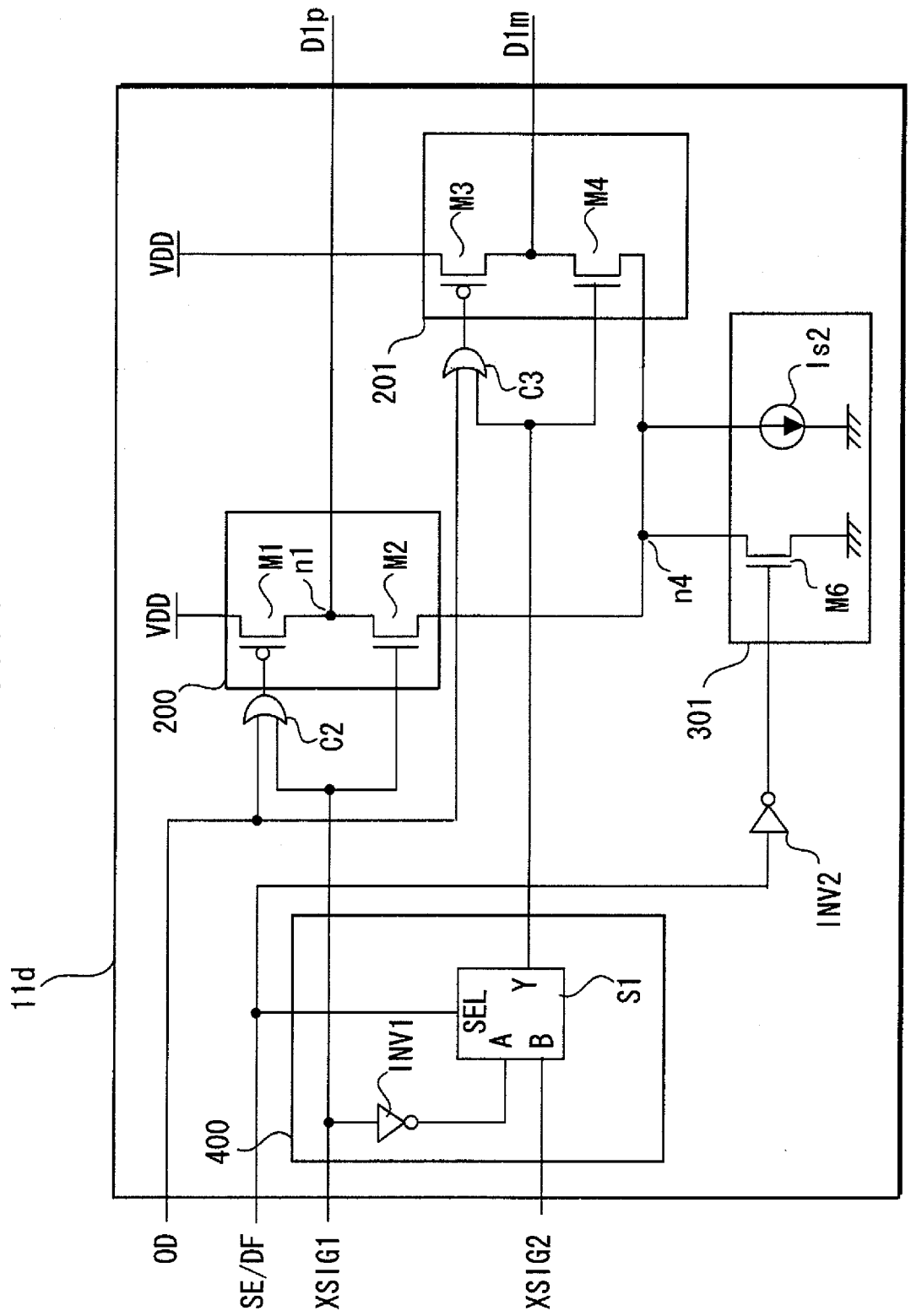
FIG. 5 is a diagram showing an example of a configuration of an interface circuit 11d in accordance with Embodiment 1 of the present invention.

(5) Note that even when the interface circuit 11d is configured as shown in FIG. 5, an interface circuit can switch among the single-ended transmission, the push-pull type differential transmission and the open-drain type differential transmission.

Although the interface circuit 11d has the identical configuration with the interface circuit 11c, the interface circuit 11d includes an OR circuit C2 as the preceding stage of the gate of the transistor M1 and an OR circuit C3 as the preceding stage of the gate of the transistor M3, instead of the transistor M7 and the AND circuit C1.

The OR circuit C2 performs OR operation on the open-drain system control signal OD and the input signal XSIG1, and outputs a signal obtained by the operation to the gate of the transistor M1. The OR circuit C3 performs OR operation on the open-drain system control signal OD and the signal outputted by the selection circuit S1, and outputs a signal obtain by the operation to the gate of the transistor M3.

When the open-drain system control signal OD and the input signal XSIG1 are respectively "H" and "H," when the open-drain system control signal OD and the input signal XSIG1 are respectively "H" and "L," and when the open-drain system control signal OD and the input signal XSIG1 are respectively "L" and "H," an output signal of the OR circuit C2 is "H" and current is not conducted between the source and the drain of the transistor M1. Neither is that of the transistor M3. Thus, similarly to the interface circuit 11c, the interface circuit 11d is able to perform the open-drain system differential transmission.

The interface circuit 11d does not include the transistor M7 of the interface circuit 11c. Since is desirable that impedance between the power supply potential VDD and the driver circuits 200 and 201 is low, in the interface circuit 11c, it is necessary to increase the size of the transistor M7 to lower the ON resistance. However, the interface circuit 11d shown in FIG. 5 does not have the transistor M7. Accordingly, compared, with the interface circuit 11c, in addition to the effect of the interface circuit 11c, the interface circuit 11d is effective in reducing the circuit area.

Note that the interface circuits 11c and 11d are each an interface circuit that switches between the push-pull system in which a power supply connected to the driver circuit is used and the open-drain type in which an external power supply is present toward an output line of the driver circuit, though detailed configurations thereof are different from each other.

Figure 6:
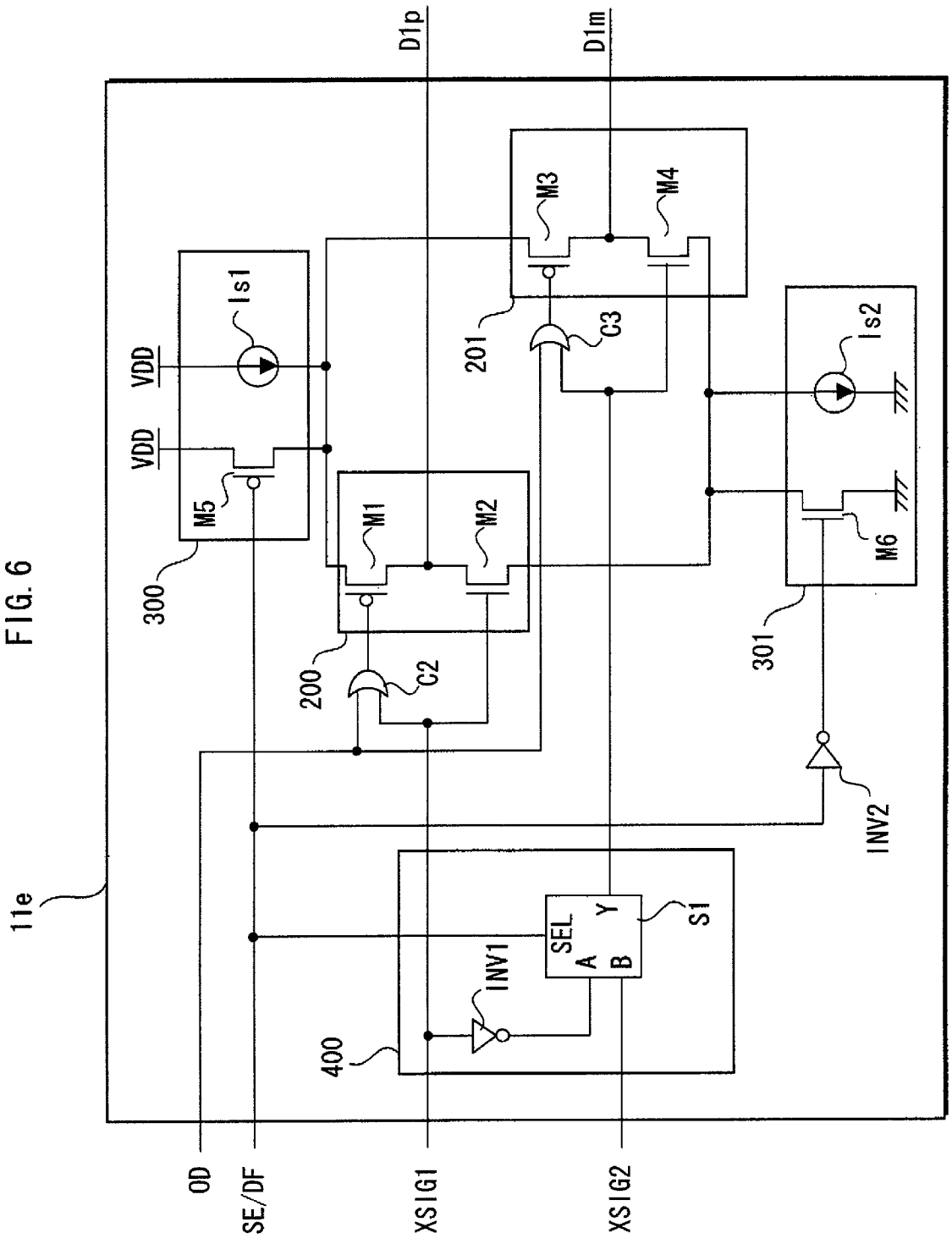
FIG. 6 is a diagram showing an example of a configuration of an interface circuit 11e in accordance with Embodiment 1 of the present invention.

(6) Subsequently, FIG. 6 shows an interface circuit 11e. The interface circuit 11e is shown as an example of a configuration of the interface circuit that can select among the voltage driving push-pull type single-ended transmission, the current driving type push-pull type differential transmission system, and the open-drain type differential transmission system. The current driving type push-pull type differential transmission system, such as LVDS, defines a midpoint potential of a differential signal to be half of the power supply (VDD).

The interface circuit 11e has the substantially identical configuration with the interface circuit 11b. Besides the constituents of the interface circuit 11b, the interface circuit 11e further includes an OR circuit C2 in the preceding stage of the gate of the transistor M1 and an OR circuit C3 in the preceding stage of the gate of the transistor M3.

Similarly to the OR circuit C2 of the interface circuit 11d, the OR circuit C2 of the interface circuit 11e performs OR operation on the open-drain system control signal OD and the input signal XSIG1, and outputs a signal obtained by the OR operation to the gate of the transistor M1. Similarly to the OR circuit C3 of the interface circuit 11d, the OR circuit C3 of the interface circuit 11e performs the OR operation on the open-drain system control signal OD and the signal outputted by the selection circuit S1, and outputs a signal obtain by the OR operation to the gate of the transistor M3.

In FIG. 6, when the interface circuit 11e performs the voltage driving type single-ended transmission, the transmission system control signal SE/DF is "L," the current is conducted between the source and the drain of each of the transistors M5 and M6. In addition, the open-drain system control signal OD is "L" and the conduction states between the sources and the drains of the transistors M1 and M3 of the driver circuits 200 and 201 are controlled by XSIG1 and XSIG2, respectively. Thus, the interface circuit 11e of FIG. 6 is able to perform the single-ended transmission.

When the interface circuit 11e of FIG. 6 performs LVDS push-pull differential transmission, the transmission system control signal SE/DF is "H." Accordingly, current is not conducted between the source and the drain of each of the transistors M5 and M6. In addition, the open-drain system control signal OD is "L" and the conduction states between the sources and the drains of the transistors M1 and M3 of the driver circuits 200 and 201 are controlled by XSIG1 and XSIG2, respectively. Thus, the interface circuit 11e is able to perform the LVDS push-pull differential transmission.

When the interface circuit 11e performs the open-drain type differential transmission, the transmission system control signal SE/DF is "H." Accordingly, current is not conducted between the sources and the drains of the transistor M5 and M6. In addition, when the open-drain type control signal OD is "H," current is not conducted between the sources and the drains of the pMOS transistors M1 and M3 of the driver circuits 200 and 201. Thus, the interface circuit 11e is able to perform the open-drain type differential transmission.

Accordingly, the interface circuit 11e shown in FIG. 6, can select among the voltage driving push-pull type single-ended transmission, the current driving type push-pull type differential transmission system, such as LVDS, that defines a midpoint potential of a differential signal to be half of the power supply potential VDD, and the open-drain type differential transmission, with the use of the same driver circuits. Accordingly, the interface circuit can suppress quality deterioration of a signal waveform during high-speed signal transmission.

(7) Note that in each interface circuit shown in FIGS. 1-6, compared with the input to the driver circuit 200, the input to the driver circuit 201 is delayed due to the internal delay of the selection circuit S1, which causes skew between signals outputted by the signal lines D1p and D1m.

Figure 7:
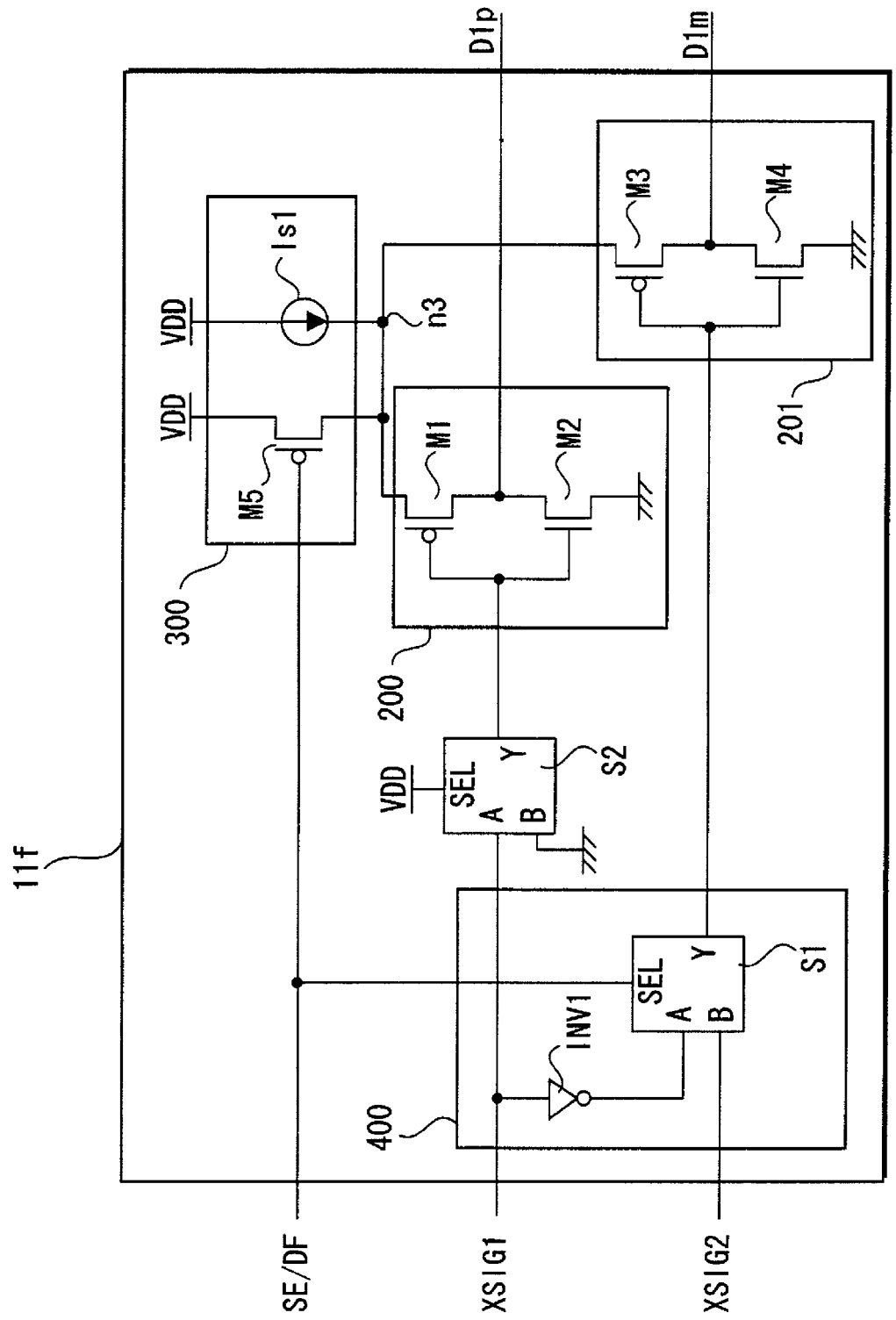
FIG. 7 is a diagram showing an example of a configuration of an interface circuit 11f in accordance with Embodiment 1 of the present invention.

When the interface circuit 11 shown in FIG. 1 is taken as an example, the following is desirable to solve the above problem. Similarly to the interface circuit 11f shown in FIG. 7, it is desirable that the input signal XSIG1 is inputted to the driver circuit 200 via the dummy selection circuit S2.

Note that in this case, in the dummy selection circuit S2, an input selection signal SEL of the selection circuit S2 is fixed to the power supply (VDD) or the ground (Vss) so that the input signal XSIG1 is regularly outputted. Thus, the interface circuit 11f is effective in reducing the skew between the two signals that are outputted to the signal lines D1p and D1m.

Figure 19:
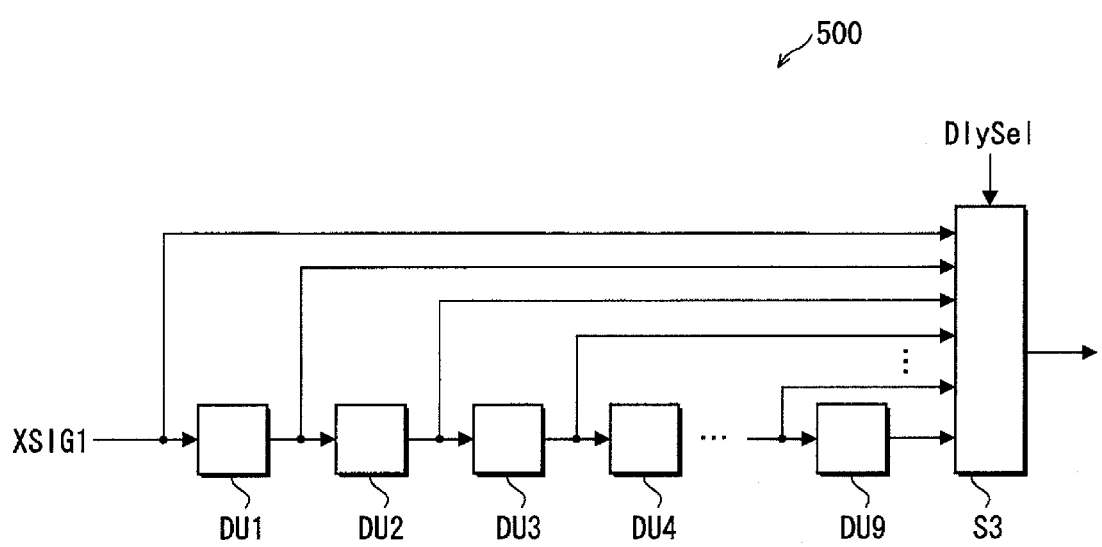
FIG. 19 is a diagram showing an example of a configuration of a delay control circuit 500 in accordance with Embodiments 1 and 2 of the present invention.

Note that even when the dummy selection circuit S2 is employed, production errors may cause propagation delay skew between the selection circuits S1 and S2. For that reason, instead of the dummy selection circuit S2, a delay control circuit 500 shown in FIG. 19 may be used. The delay control circuit 500 is composed of a plurality of delay circuits DU1, DU2, DU3, DU4 and etc. that are connected in series and the selection circuit S3. The input signal XSIG1 is delayed sequentially by the delay circuits DU1, DU2, DU3, DU4 and etc. that are connected in series. A delay amount selection signal DlySel controls which delay circuit's output is outputted from the selection circuit S3 to the driver circuit 200. Actual trials determine the selection of which delay circuit's output. With this configuration, the delay time of the signals outputted to the driver circuit 200 is accurately controlled.

Figure 8:
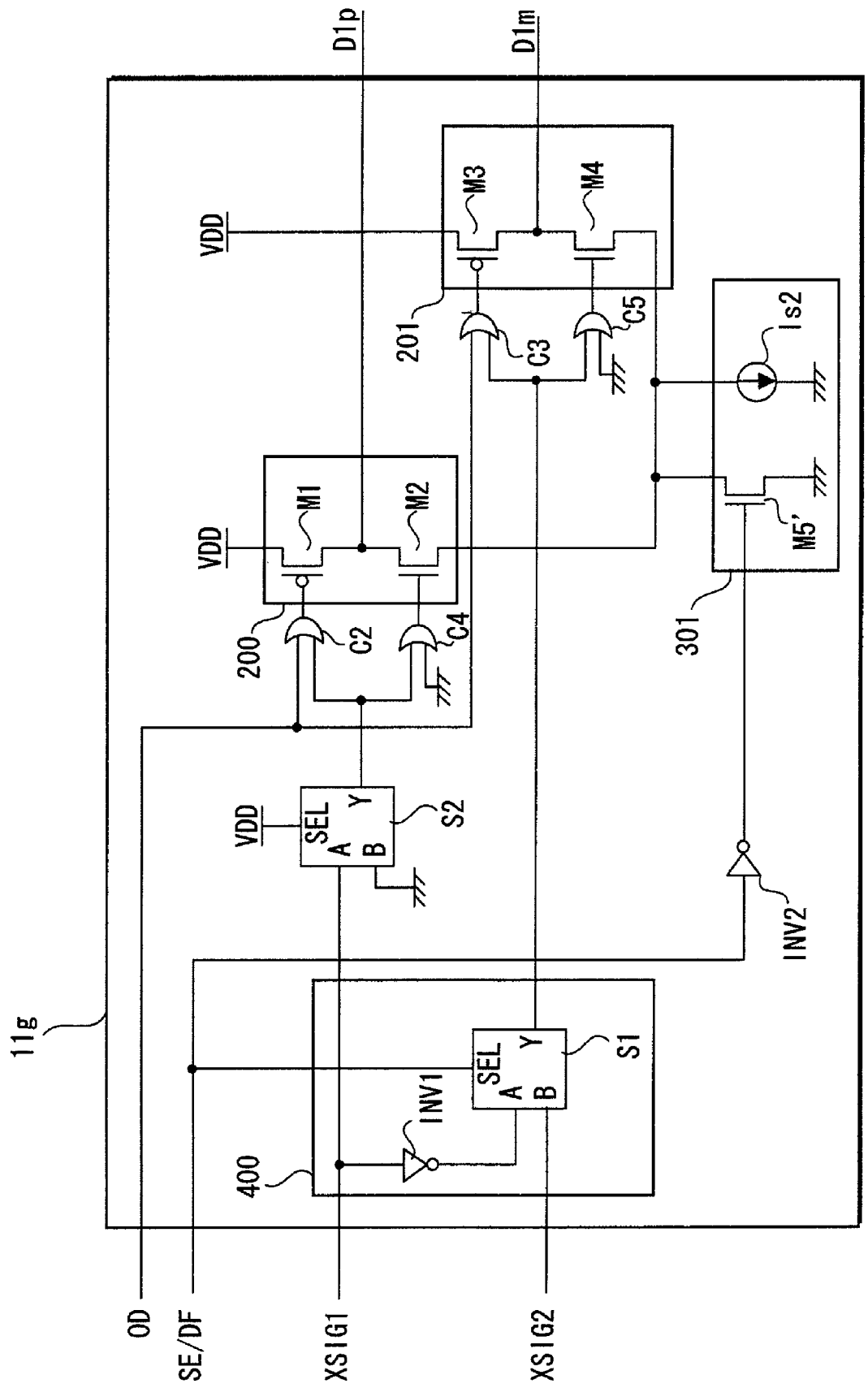
FIG. 8 is a diagram showing an example of a configuration of an interface circuit 11g in accordance with Embodiment 1 of the present invention.

(8) In addition, in the interface circuits 11d and 11e shown in FIGS. 5 and 6, respectively, in addition to the delay caused by the selection circuit S1, due to the internal delays caused by the logic circuits C2 and C3 that are in the preceding stages of the driver circuits 200 and 201, signal transmission to the pMOS transistors M1 and M3 respectively included in the driver circuits 200 and 201 lags behind signal transmission to the nMOS transistors M2 and M4. Accordingly, since there is different switching timing for the pMOS transistor and the nMOS transistor, the signal waveforms outputted to the signal lines D1p and D1m are distorted. When the interface circuit 11d shown in FIG. 5 is taken as an example, the following is desirable to solve the above problem. Similarly to the interface circuit 11g shown in FIG. 8, it is desirable to set dummy logic circuits C4 and C5 in the preceding stage of the gates of the nMOS transistors M2 and M4. The dummy logic circuit C4 is an OR circuit that performs OR operation on an output signal of the dummy selection circuit S2 and the ground (potential Vss). A signal obtained by the OR operation is outputted to the gate of the transistor M2. The above also applies to the dummy logic circuit C5. Note that in the interface circuit 11g, the dummy selection circuit S2 precedes the logic circuits C2 and C4. The dummy selection circuit S2 of the interface circuit 11g is identical with the dummy selection circuit S2 of the interface circuit 11f. Accordingly, the same effect as the interface circuit 11f is created.

Thus, interface circuit 11g is effective in reducing deterioration of the quality of signals the interface circuit 11g outputs to the signal lines D1p and D1m.

(9) Note that in each interface circuit of FIGS. 1-8, the input signal XSIG1 to the input control circuit 400 may be outputted from a parallel-serial conversion circuit. Thus, a plurality of signals in the LSI internal circuit may be converted to serial signals with the use of the parallel-serial conversion circuit and outputted to the input control circuit 400.

Embodiment 2

Figure 9:
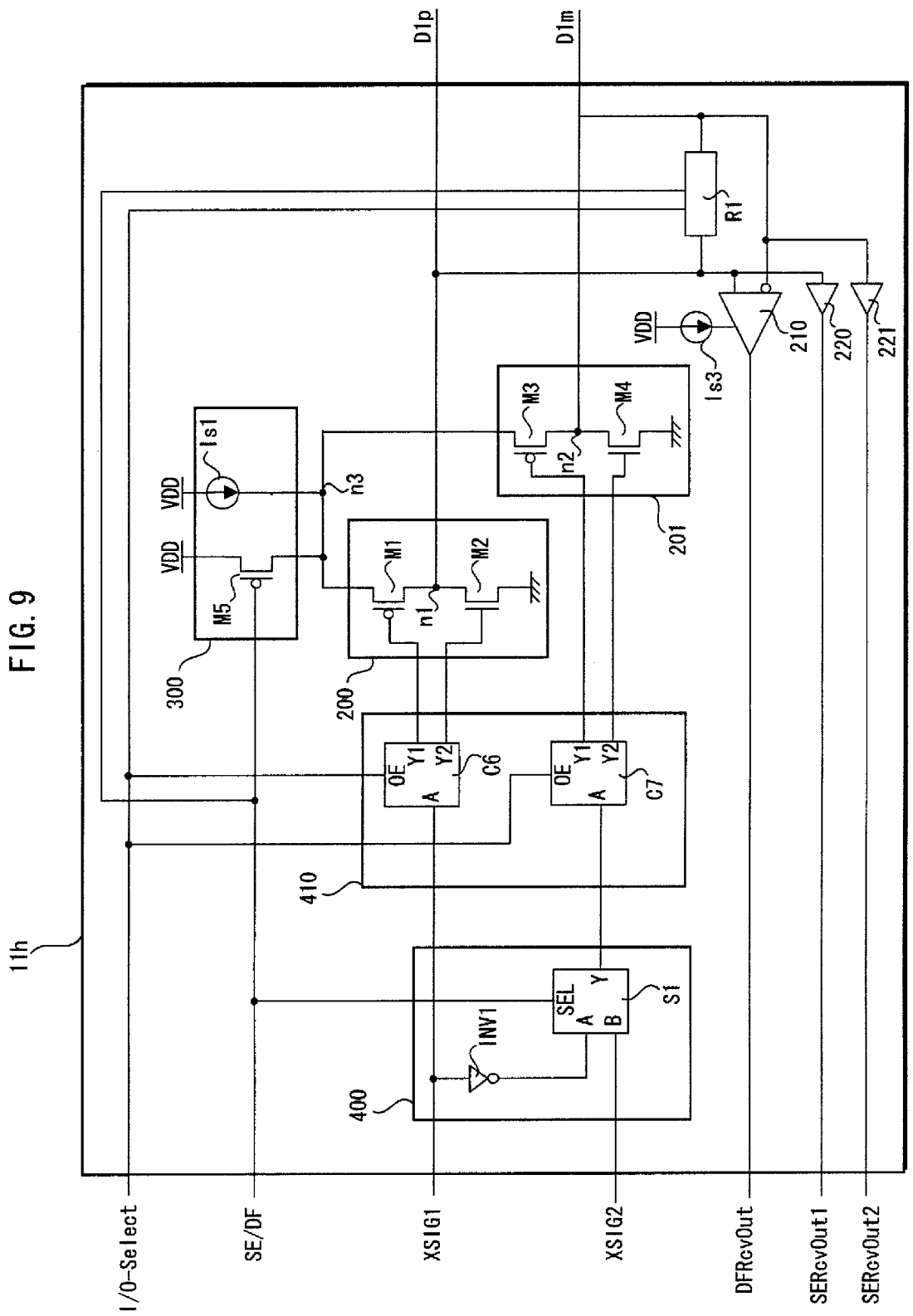
FIG. 9 is a diagram showing an example of a configuration of an interface circuit 11h in accordance with Embodiment 2 of the present invention.

(1) FIG. 9 shows a bidirectional interface circuit 11h that can switch between the single-ended transmission and the differential transmission in accordance with Embodiment 2 of the present invention. The differences between the interface circuit 11h and the interface circuit 11 of Embodiment 1 are as follows. In addition to the constituents of the interface circuit 11, the interface circuit 11h further includes a current supply circuit Is3, a differential receiver 210, a termination resistance circuit R1 that functions as a termination of a differential transmission line, single-ended receivers 220 and 221 and an output control circuit 410 composed of logic circuits C6 and C7. The following is a description on each circuit.

The bidirectional interface circuit 11h receives an I/O (Input/Output) system control signal I/O-Select via an input terminal thereof from the outside. When the I/O system control signal I/O-Select is "L," the bidirectional interface circuit 11h is in a signal reception state. When the I/O system control signal I/O-Select is "H," the bidirectional interface circuit 11h is in a signal transmission state.

The driver circuit 200 is constituted of the transistors M1 and M2 and functions as a push-pull output stage circuit. The output node n1 of the driver circuit 200 is connected to the signal line Dip. Similarly, the driver circuit 201 is constituted of the transistors M3 and M4 and functions as a push-pull output stage circuit. The output node n2 of the driver circuit 201 is connected to the signal line Dim.

The drive control circuit 300 includes the transistor M5 and the current supply circuit Is1 that controls output current. The transmission system control signal SE/DF controls the conduction state between the source and the drain of the transistor M5. Thus, the drive control circuit 300 can control the driver circuits 200 and 201 to be driven with selective use of the voltage driving system and the current driving system. Herein, conducting, the resistance between the source and the drain (ON resistance) of the transistor M5 is lower than those of the transistors M1, M2, M3 and M4.

The input control circuit 400 includes the selection circuit S1 and the logic inversion circuit INV1, and controls the outputs of the input signals XSIG1 and XSIG2 inputted in the driver circuits. More specifically, the input control circuit 400 outputs the input signal XSIG1 to the logic circuit C6 included in the output control circuit 410. According to the transmission system control signal SE/DF, the input control circuit 400 selectively outputs the inverted logic signal of the input signal XSIG1 or the input signal XSIG2 selected by the selection circuit S1 to the logic circuit C7.

The logic circuit C6 that constitutes the output control circuit 410 has a terminal A, a terminal OE, a terminal Y1 and a terminal Y2. The logic circuit C6 receives the input signal XSIG1 from the input control circuit 400 via the A terminal. In addition, the I/O system control signal I/O-Select that has been received from the OE terminal controls which signal to be outputted to the driver circuit 200. The description is made on specific operation of the bidirectional interface circuit 11h using the following case taken as an example. When the I/O system control signal I/O-Select is "L," the bidirectional interface circuit 11h is in the signal reception state, and when the I/O system control signal I/O-Select is "H," the bidirectional interface circuit 11h is in the signal transmission state.

The I/O system control signal I/O-Select is "L" (the bidirectional interface circuit 11h is in a signal reception state), regardless of signals received from the input control circuit 400, the logic circuit C6 outputs "H" from the Terminal Y1 to the gate of the transistor M1 and "L" from the terminal Y2 to the gate of the transistor M2.

Thus, the two transistors M1 and M2 of the driver circuit 200 are each in a non-conduction state, and output of the driver circuit 200 is at high impedance, which does not influence the waveform of a signal inputted from the signal line Dip.

In addition, when the I/O system control signal I/O-Select is "H" (the bidirectional interface circuit 11h is in a signal transmission state), the logic circuit C6 outputs the input signal XSIG1 received from the input control circuit 400 from the terminals Y1 and Y2 to the gates of the transistors M1 and M2.

Since the configuration of the logic circuit C7 is identical with that of the logic circuit C6, its description is omitted.

The logic circuit C7 receives the inverted logic signal of the input signal XSIG1 or the input signal XSIG2 from the A terminal, and receives the I/O system control signal I/O-Select from the OE terminal. In addition, the logic circuit C7 outputs the signals from the terminals Y1 and Y2s to the gates of the transistors M3 and M4, respectively.

Both ends of the termination resistance circuit R1 are connected to the signals lines D1p and D1m. When the bidirectional interface circuit 11h performs the differential transmission, and receives signals from the host machine via the signal lines D1p and D1m, the termination resistance circuit R1 functions as a termination resistance circuit of differential transmission lines composed of the signal lines D1p and D1m. When the bidirectional interface circuit 11h receives signals from the host machine using the single-ended transmission, and when the bidirectional interface circuit 11h outputs signals to the signal lines D1p and D1m, the termination resistance circuit R1 does not function as a termination resistance, and thereby being at high impedance.

Figure 18:
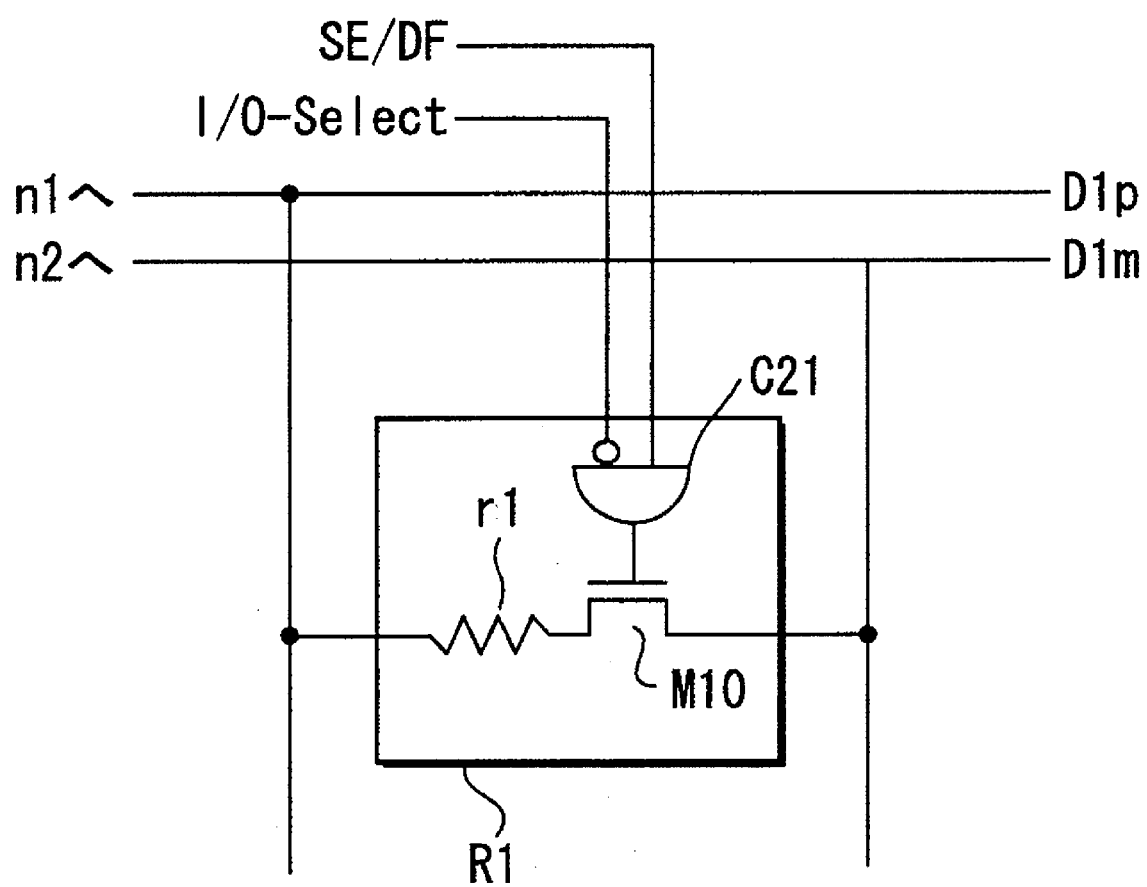
FIG. 18 is a diagram showing an example of a configuration of a termination resistance circuit R1 in accordance with Embodiment 2 of the present invention.

Note that FIG. 18 shows a specific example of a configuration of the termination resistance circuit R1.

A combination of the I/O system control signal I/O-Select and the transmission system control signal SE/DF controls the conduction state of a transistor M10. Only when the bidirectional interface circuit 11h receives a differential signal, the transistor M10 is conducting. Accordingly, the termination resistance circuit R1 becomes functional.

The termination resistance circuit R1 includes an AND circuit C21, a resistance r1 and the transistor M10. The AND circuit C21 receives the transmission system control signal SE/DF and an inversion signal of the I/O system control signal I/O-Select, performs the AND operation on the signals, and outputs a signal obtained by the AND operation to the gate of the transistor M10. A source of the transistor M10 is connected to the signal line D1m, and a drain of the transistor M10 is connected to one end of the resistance r1. Another end of the resistance r1 is connected to the signal line D1p.

The following indicates a logical relationship among the transmission system control signal SE/DF, the I/O system control signal I/O-Select and the conduction state of the transistor M10.

| SE/DF | I/O | inv(I/O) | AND | M10 |
|---|---|---|---|---|
| L(SE) | L(Reception) | H | L | Non-conducting |
| H(DF) | L(Reception) | H | H | Conducting |
| L(SE) | H(Transmission) | L | L | Non-conducting |
| H(DF) | H(Transmission) | L | L | Non-conducting |

Herein, the "SE/DF" and "I/O" indicate the transmission system control signal SE/DF and the I/O system control signal I/O-Select, respectively. The above "inv(I/O)" indicates an inversion signal of the I/O system control signal I/O-Select, and the "AND" indicates the AND operation on the transmission system control signal SE/DF and the inversion signal of the I/O system control signal I/O-Select. The "M10" indicates a conduction state of the transistor M10.

When the transmission system control signal SE/DF and the I/O system control signal I/O-Select are "H" and "L" respectively, which is when the bidirectional interface circuit 11h is operated in the reception state with the use of the differential transmission system, the transistor M10 is conducting, and the termination resistance circuit R1 functions as a termination resistance. In other cases, the transistor M10 is not conducting, and the termination resistance circuit R1 does not function as a termination resistance and is at high impedance.

Note that even when the bidirectional interface circuit 11h performs the differential transmission with regard to the signal lines D1p and D1m and when signal transmission to the host machine is performed, the termination resistance circuit R1 may be operated. This case is effective in reducing reflection wave occurred due to impedance mismatch among signal lines D1p and D1m and the transmission lines of the host machine.

The differential receiver 210 of the bidirectional interface circuit 11h receives the differential signals transmitted from the host machine via the signal lines D1p and D1m. The received differential signals are outputted via the signal line DFRcvOut.

The single-ended receivers 220 and 221 of the bidirectional interface circuit 11h respectively receive single-ended signals transmitted from the host machine via the signal lines Dip and Dim, and outputs the received single-ended signals via the signal lines SERcvOut1 and SERcvOut2.

Subsequently, the following describes operations of transmission and reception of the bidirectional interface circuit 11h performing the voltage driving push-pull type single-ended transmission and the current driving push-pull type differential transmission.

(When the Bidirectional Interface Circuit 11h is Operated in Transmission Mode with the Use of the Voltage Driving Push-Pull Type Single-Ended Transmission System)

When the bidirectional interface circuit 11h is operated in the signal transmission state by the voltage driving push-pull type single-ended transmission, the I/O system control signal I/O-Select is "H" and the transmission system control signal SE/DF is "L."

In this case, the selection circuit S1 included in the input control circuit 400 outputs the signal XSIG2 having been inputted from the terminal B to the terminal Y.

Since the I/O system control signal I/O-Select is "H," the output control circuit 410 outputs the signal XSIG1 received from the input control circuit 400 to the driver circuit 200 from the terminals Y1 and Y2 of the logic circuit C6. Similarly, the output control circuit 410 outputs the signal XSIG2 from the terminals Y1 and Y2 of the logic circuit C7 to the driver circuit 201.

In the drive control circuit 300, since the transmission system control signal SE/DF is "L," current is conducted between the source and the drain of the transistor M5. As described above, since the ON resistance of the transistor M5 is sufficiently low that the potential of the node n3 is almost equal to the power supply potential VDD. As a result, the current supply circuit Is1 does not supply constant current.

When I/O-Select is "H" and when the transmission system control signal SE/DF is "L," which is to say when the bidirectional interface circuit 11h is in the voltage driving push-pull type single-ended transmission mode, the termination resistance circuit R1 is at high impedance. Therefore, the termination resistance circuit R1 does not function as a termination resistance circuit, thereby not influencing the waveforms of signals.

Accordingly, the driver circuits 200 and 201 output signals to the signal lines Dip and Dim with the use of the voltage driving system.

Thus, since the bidirectional interface circuit 11h outputs the input signal XSIG1 the signal line D1p from the driver circuit 200 and the input signal XSIG2 from the driver circuit 201 to the signal line D1m by the voltage driving system, the bidirectional interface circuit 11h is able to function as a two-channel interface circuit and is operated by the voltage driving push-pull type single-ended transmission system.

(When the Bidirectional Interface Circuit 11h is Operated in the Reception Mode with the Use of the Voltage Driving Push-Pull Type Single-Ended Transmission System)

When the bidirectional interface circuit 11h is operated in the signal reception state with the use of the voltage driving push-pull type single-ended transmission, the I/O system control signal I/O-Select is "L" and the transmission system control signal SE/DF is "L."

In the output control circuit 410, since the I/O system control signal I/O-Select is "L," as described above, the logic circuits C6 and C7 output "H" from the Terminal Y1 and "L" from the terminal Y2, regardless of signals received from the input control circuit 400.

Accordingly, the outputs from the driver circuits 200 and 201 are at high impedance, which does not influence the waveforms of the single-ended signal received from the host machine via the signal lines D1p and D1m.

When the I/O system control signal I/O-Select is "L" and when the transmission system control signal SE/DF is "L," the termination resistance circuit R1 is at high impedance. Thus, the termination resistance circuit R1 does not function as a termination resistance circuit, thereby not influencing the waveform of the received single-ended signals.

The single-ended receivers 220 and 221 each receive single-ended signals transmitted from the host machine via the signal lines D1p and D1m. The received single-ended signals are transmitted to an external circuit (unshown) of the bidirectional interface circuit 11h via the signal lines SERcvOut1 and SERcyOut2.

Thus, the bidirectional interface circuit 11h is able to receive two single-ended signals from the external host machine via the signal lines D1p and D1m.

(When the Bidirectional Interface Circuit 11h is Operated in the Signal Transmission Mode with the Use of the Current Driving Type Differential Transmission System)

When the bidirectional interface circuit 11h is operated in the signal transmission state with the use of the current driving differential transmission, the I/O system control signal I/O-Select is "H" and the transmission system control signal SE/DF is "H." In this case, the selection circuit S1 included in the input control circuit 400 outputs the inverted logic signal of the signal XSIG1 having been inputted to the terminal A from the terminal Y.

Since the I/O system control signal I/O-Select is "H," the output control circuit 410 outputs the signals XSIG1 and the inverted logic signal of the signal XSIG1 received from the input control circuit 400, as described above, to the driver circuits 200 and 201, respectively.

In the drive control circuit 300, since the transmission system control signal SE/DF is "H," current is not conducted between the source and the drain of the transistor M5.

Accordingly, the current supply circuit Is1 supplies constant current to the driver circuits 200 and 201.

Accordingly, the bidirectional interface circuit 11h is able to transmit signals with use of the current driving push-pull type differential transmission.

(When the Bidirectional Interface Circuit 11h is Operated in the Signal Reception Mode with the Use of the Current Driving Type Differential Transmission System)

When the bidirectional interface circuit 11h is operated in the signal reception state with the use of the current driving type differential transmission system, the I/O system control signal I/O-Select is "L" and the transmission system control signal SE/DF is "H."

In the output control circuit 410, since the I/O system control signal I/O-Select is "L," as described above, the logic circuits C6 and C7 output "H" from the Terminal Y1 and "L" from the terminal Y2 regardless of signals received from the input control circuit 400.

Accordingly, the outputs of the driver circuits 200 and 201 are at high impedance, which does not influence the waveforms of the signals received from the host machine via the signal lines D1p and D1m.

When the I/O system control signal I/O-Select is "L" and when the transmission system control signal SE/DF is "H," the termination resistance circuit R1 functions as a termination resistance circuit, thereby generating potential difference in the differential signals transmitted from the host machine via the signal lines D1p and D1m.

The differential receiver 210 receives differential signals from the signal lines D1p and D1m, amplifies the received signals to a signal level available for the use by the logic circuit, and outputs the amplified signals via the signal line DFRcvOut.

Thus, the bidirectional interface circuit 11h is able to receive differential signals from the external host machine via the signal lines Dip and Dim.

With the above configuration, the bidirectional interface circuit 11h can output in the single-ended transmission and the differential transmission with the use of the driver circuits 200 and 201.

Accordingly, being free from load capacity of an unnecessary output stage circuit, the interface circuit according to the present invention can suppress deterioration of quality of a signal waveform during high-speed signal transmission and reception.

In addition, the output stage circuits of the single-ended transmission and the differential transmission are integrated, which is effective in reducing the circuit area.

(2) Subsequently, the following describes a bidirectional interface circuit 11i as an example of a modification of the bidirectional interface circuit 11h.

Figure 10:
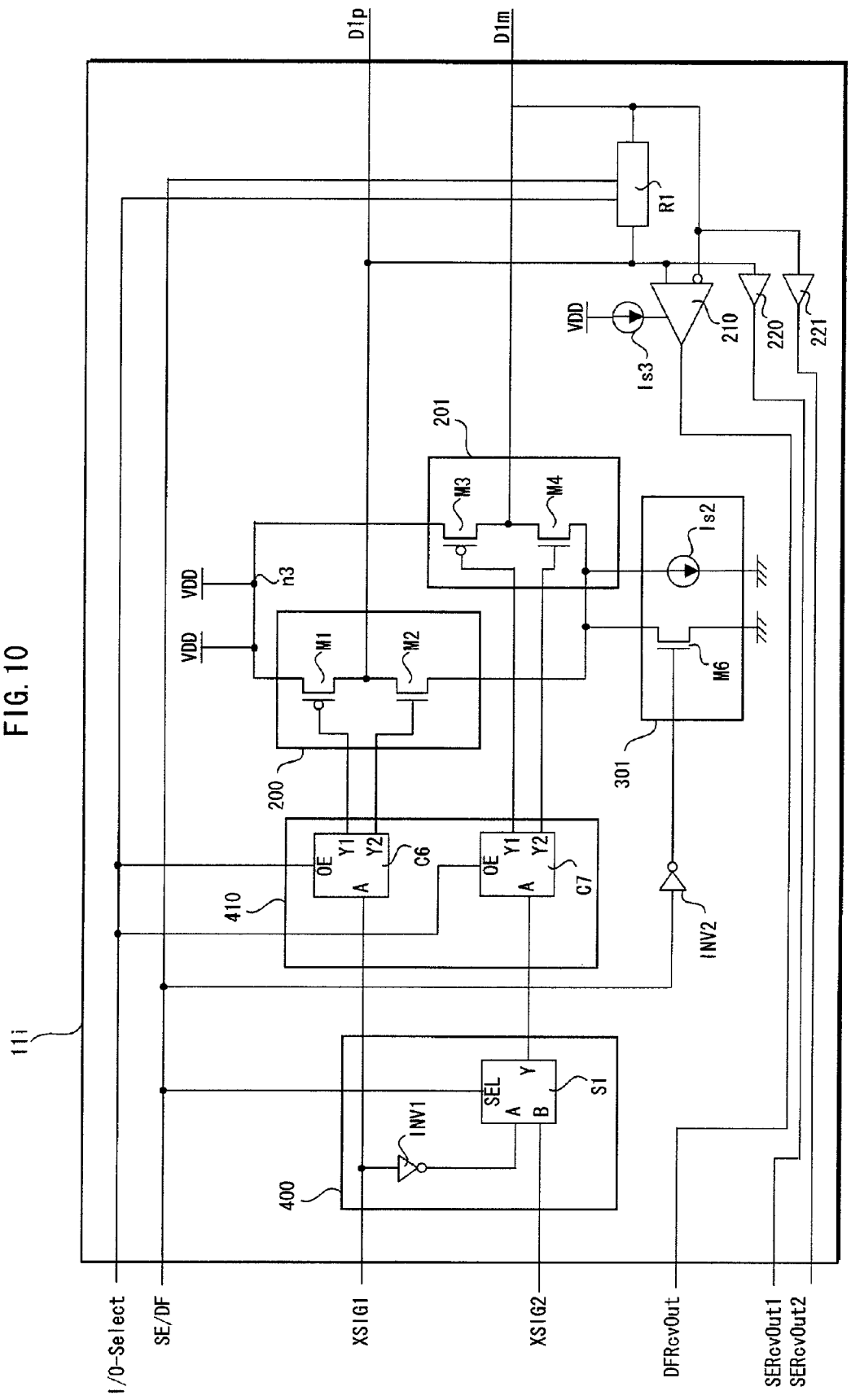
FIG. 10 is a diagram showing an example of a configuration of an interface circuit 11i in accordance with Embodiment 2 of the present invention.

As shown in FIG. 10, the bidirectional interface circuit 11i includes a drive control circuit 301, instead of the drive control circuit 300 of the bidirectional interface circuit 11h, and the logic inversion circuit INV2.

In the bidirectional interface circuit 11i, the driver circuits 200 and 201 are connected to the ground (potential Vss) via the drive control circuit 301 composed of the current supply circuit Is2 and the nMOS transistor M6.

Note that the relation between the bidirectional interface circuits 11h and 11i is basically identical with the relation between the interface circuits 11 and 11a shown in FIGS. 1 and 2, respectively.

In the bidirectional interface circuit 11h shown in FIG. 9, the drive control circuit 300 connects the driver circuits 200 and 201 and the power supply potentials VDD. However, in general, when the ON resistance of the nMOS transistor is identical with that of the pMOS transistor, the nMOS transistor can be realized in a smaller area than the pMOS transistor. Accordingly, in addition to the effect due to the configuration of the bidirectional interface circuit 11h of FIG. 9, the bidirectional interface circuit 11i of FIG. 10 can be realized in a smaller size.

(3) Subsequently, the following describes a bidirectional interface circuit 11j as an example of a modification of the bidirectional interface circuit 11h or 11i.

The bidirectional interface circuit 11j is a configuration example of an interface circuit that complies with a transmission standard, such as LVDS, defining a midpoint potential of a differential signal to be half of the power supply (VDD).

In addition to the constituents of the bidirectional interface circuit 11h, the bidirectional interface circuit 11j further includes the drive control circuit 301 and the logic inversion circuit INV2. Alternatively, it can be said that the bidirectional interface circuit 11j further includes the drive control circuit 300 of the bidirectional interface circuit 11h in addition to the constituents of the bidirectional interface circuit 11h.

In the bidirectional interface circuit 11j, the driver circuits 200 and 201 are connected to the power supply potential VDD via the drive control circuit 300, and the driver circuits 200 and 201 are connected to the ground (potential Vss) via the drive control circuit 301.

As described above, it is desirable that the ON resistances of the transistors M5 and M6 are sufficiently low. It is also desirable that the current driving capability and the ON resistances of the current supply circuits Is1 and Is2 are substantially equal to each other. With this configuration, a midpoint potential of a differential signal outputted by the bidirectional interface circuit 11j is half of the power supply potential VDD.

Figure 11:
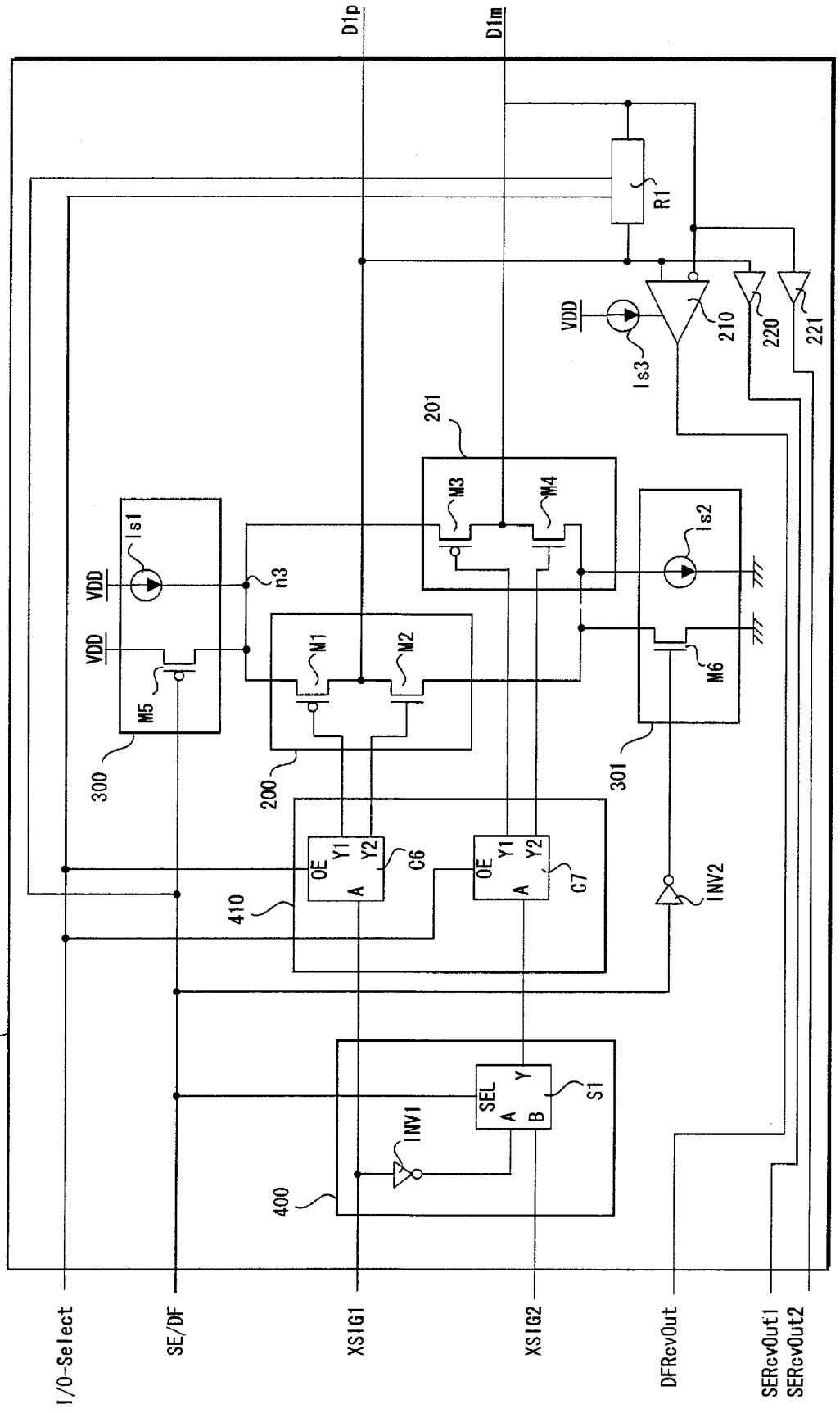
FIG. 11 is a diagram showing an example of a configuration of an interface circuit 11j in accordance with Embodiment 2 of the present invention.

With the configuration shown in FIG. 11, the interface circuit 11j can switch between the voltage driving push-pull type single-ended transmission and the LVDS differential transmission with the use of the same driver circuits. Thus, the bidirectional interface circuit can suppress quality deterioration of a signal waveform during high-speed signal transmission.

Figure 12:
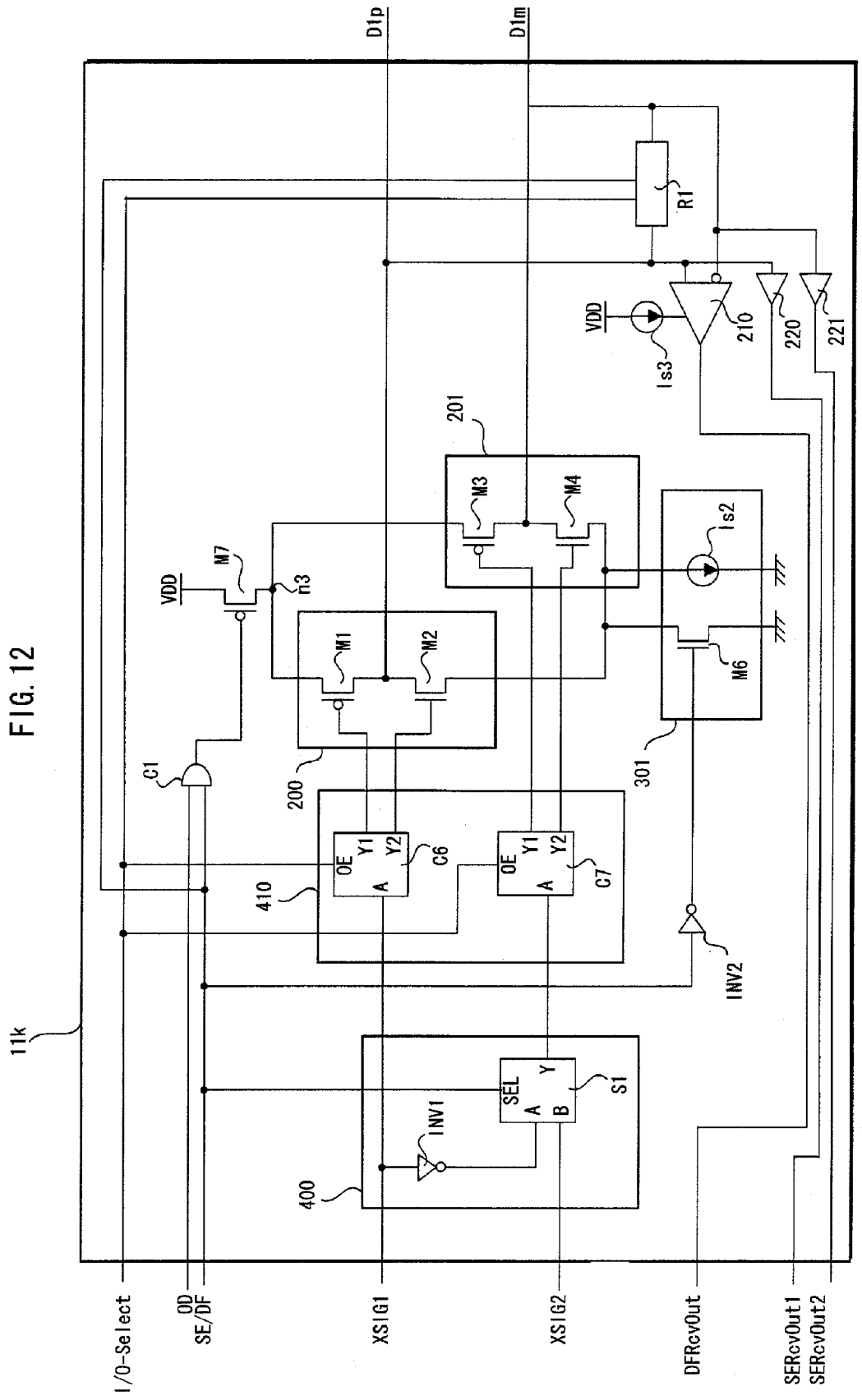
FIG. 12 is a diagram showing an example of a configuration of an interface circuit 11k in accordance with Embodiment 2 of the present invention.

(4) Subsequently, FIG. 12 shows a bidirectional interface circuit 11k that is also compliant with the open-drain type differential transmission standard, such as HDMI.

In addition to the constituents of the interface circuit 11c, the bidirectional interface circuit 11k includes the current supply circuit Is3, the differential receiver 210, the termination resistance circuit R1, the single-ended receivers 220 and 221, and the output control circuit 410.

When the bidirectional interface circuit 11k performs the open-drain type differential transmission, the transmission system control signal SE/DF is "H" and current is not conducted between the source and the drain of the transistor M6. In addition, the open-drain type control signal OD is "H" and current is not conducted between the source and the drain of the transistor M7, either. In this condition, the current supply circuit Is2 is operated to draw current from the power supply (VDD) of the host machine via a pull-up resistor (unshown). The host machine is connected to the bidirectional interface circuit 11k via the signal lines D1p and D1m, and includes the power supply and the pull-up resistor. The pull-up resistor is connected to the power supply (VDD) and the signal lines D1p and D1m. Thus, the bidirectional interface circuit 11k is able to perform the open-drain type differential transmission.

When the transmission type control signal SE/DF is "H" and when the open-drain type control signal OD is "L," the bidirectional interface circuit 11k is able to perform the current driving push-pull type differential transmission similarly to the interface circuit 11a shown in FIG. 2.

When the transmission type control signal SE/DF is "L," current is conducted between the source and the drain of the transistor M6. In addition, regardless of the open-drain type control signal OD, current is also conducted between the source and the drain of the transistor M7. Accordingly, the bidirectional interface circuit 11k is able to perform the voltage driving push-pull type single-ended transmission.

With the configuration of the bidirectional interface circuit 11k shown in FIG. 12, the bidirectional interface circuit 11k can switch among the voltage driving push-pull type single-ended transmission, the current driving push-pull type differential transmission, and the current driving open-drain type differential transmission with the use of both of the driver circuits 200 and 201. Thus, being free from load capacity of an unnecessary output stage circuit, a bidirectional interface circuit can suppress deterioration of quality of a signal waveform during high-speed signal transmission.

(5) Subsequently, the following describes a bidirectional interface circuit 11L as an example of a modification of the bidirectional interface circuit 11k.

Figure 13:
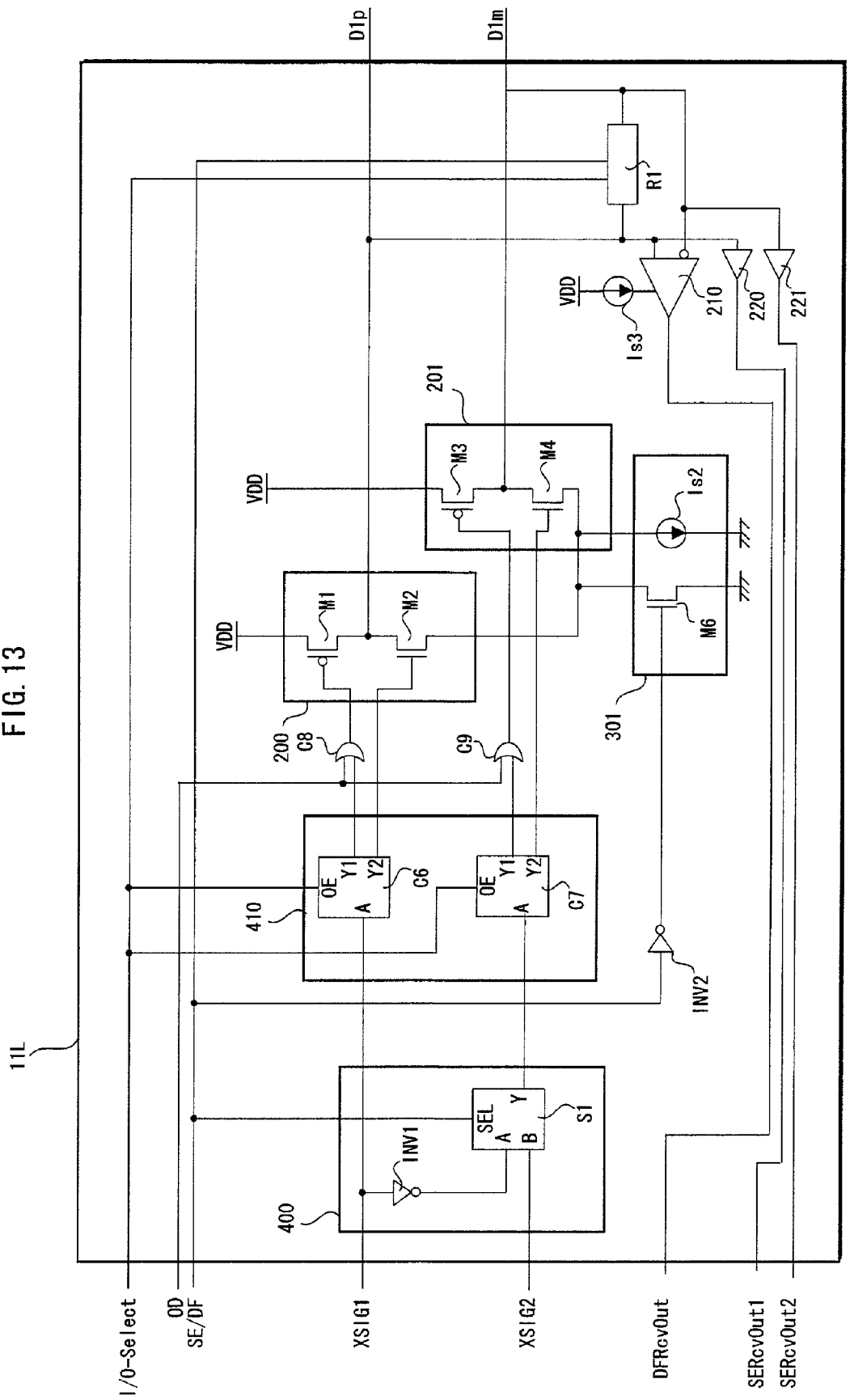
FIG. 13 is a diagram showing an example of a configuration of an interface circuit 11L in accordance with Embodiment 2 of the present invention.

Similarly to the interface circuit 11d, instead of the transistor M7 and the AND circuit C1 of the bidirectional interface circuit 11k, the bidirectional interface circuit 11L shown in FIG. 13 includes an OR circuit C8 as a logic circuit in the preceding stage of the gate of the transistor M1 and an OR circuit C9 as a logic circuit in the preceding stage of the gate of the transistor M3.

Configured as the bidirectional interface circuit 11L, the interface circuit can switch among the single-ended transmission, the push-pull type differential transmission and the open-drain type differential transmission.

In addition, the bidirectional interface circuit 11L does not include the transistor M7 included in the bidirectional interface circuit 11k. Since it is desirable that the current between the power supply potentials VDD and the driver circuits 200 and 201 is at low impedance, it is necessary to lower the ON resistance by increasing the size of the transistor M7. Fortunately, the bidirectional interface circuit 11L does not have the transistor M7. For that reason, the bidirectional interface circuit 11L is effective in reducing the circuit area.

Figure 14:
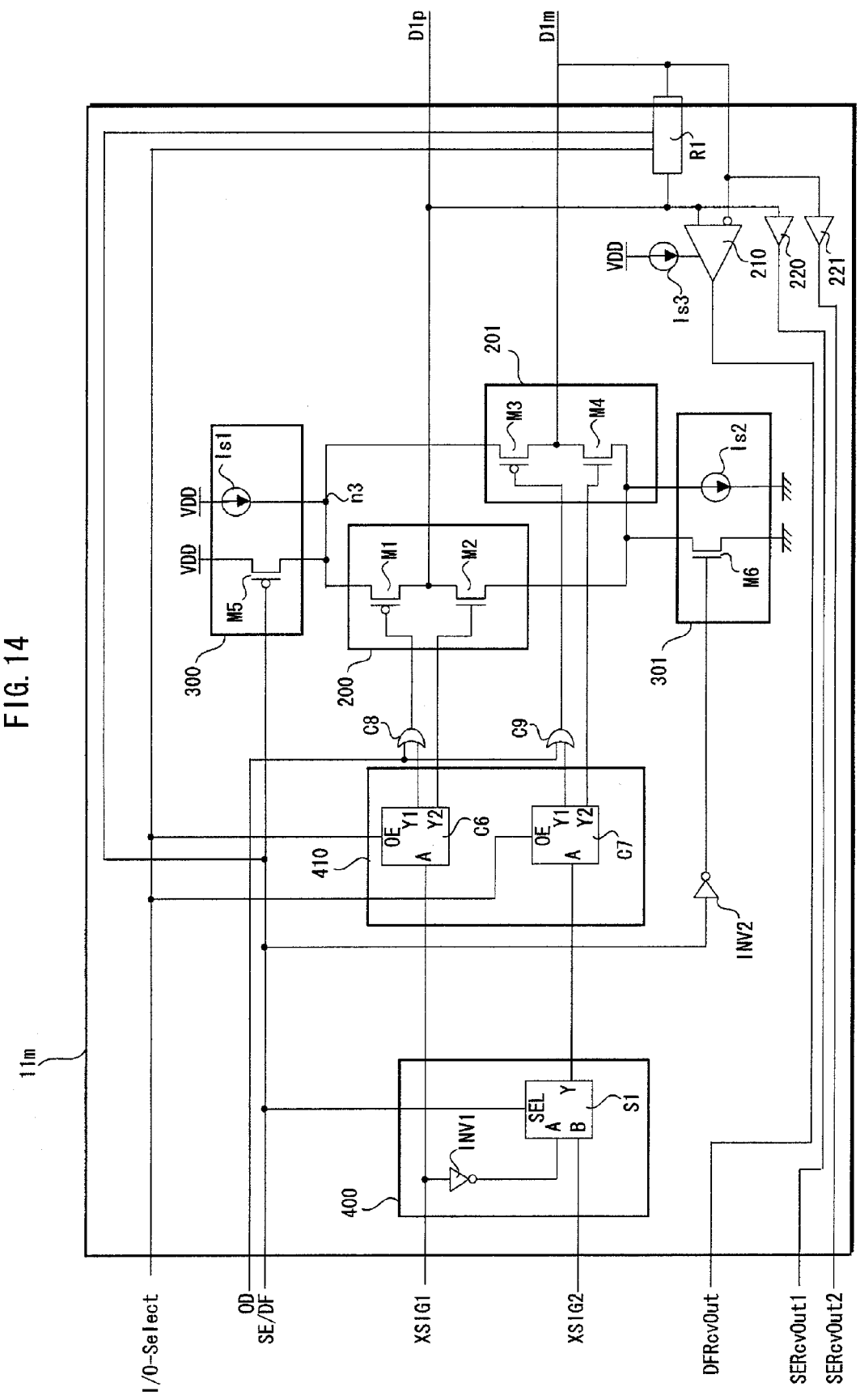
FIG. 14 is a diagram showing an example of a configuration of an interface circuit 11m in accordance with Embodiment 2 of the present invention.

(6) Subsequently, FIG. 14 shows a bidirectional interface circuit 11m that can select among the voltage driving push-pull type single-ended transmission, the current driving type push-pull type differential transmission system, such as LVDS, defining the midpoint potential of a differential signal to be half of the power supply (VDD), and the open-drain type differential transmission system.

Similarly to the interface circuit 11L, in addition to the constituents of the bidirectional interface circuit 11j, the bidirectional interface circuit 11m further includes an OR circuit C8 as a logic circuit in the preceding stage of the gate of the transistor M1 and an OR circuit C9 as a logic circuit in the preceding stage of the gate of the transistor M3.

When the bidirectional interface circuit 11m performs the voltage driving type single-ended transmission, the transmission system control signal SE/DF is "L," the I/O system control signal I/O-Select is "H," and the open-drain system control signal OD is "L." Accordingly, current is conducted between the source and the drain of each of the transistors M5 and M6.

According to the status of each of the control signals I/O-Select and SE/DF, the input control circuit 400, the output control circuit 410 and the OR circuits C8 and C9 output the signals XSIG1 and XSIG2 to the driver circuits 200 and 201. The termination resistance circuit R1 is at high impedance. Accordingly, the bidirectional interface circuit 11m is able to perform the single-ended transmission.

When the bidirectional interface circuit 11m performs the LVDS push-pull differential transmission, the transmission system control signal SE/DF is "H," the I/O system control signal I/O-Select is "H," and the open-drain system control signal OD is "L." Accordingly, since current is not conducted between the source and the drain of each of the transistors M5 and M6, the constant current is supplied from the drive control circuit 300 to the driver circuits 200 and 201. In addition, according to the state of each of the I/O system control signal I/O-Select and the transmission system control signal SE/DF, the input control circuit 400, the output control circuit 410 and the OR circuits C8 and C9 output the input signal XSIG1 to the driver circuit 200, and the inverted logic signal of the input signal XSIG1 to the driver circuit 201. The termination resistance circuit R1 is at high impedance, thereby not functioning as a termination resistance circuit. Accordingly, the bidirectional interface circuit 11m is able to perform the current driving push-pull differential transmission.

Note that, in the bidirectional interface circuit 11m, the termination resistance circuit R1 may be operated. In this case, a differential signal outputted by the bidirectional interface circuit 11m can suppress a reflection component being reflected by the host machine (unshown) connected to the signal lines Dip and Dim and returning to the bidirectional interface circuit 11m.

When the bidirectional interface circuit 11m performs the Open-drain type differential transmission, the transmission system control signal SE/DF is "H" and current is not conducted between the sources and the drains of the transistors M5 and M6. In addition, the open-drain system control signal OD is "H" and the current is not conducted between the sources and the drains of the pMOS transistors M1 and M3 of the respective driver circuits 200 and 201. Thus, the bidirectional interface circuit 11m is able to perform the open-drain type differential transmission.

Accordingly, with the above configuration of the bidirectional interface circuit 11m shown in FIG. 14, an interface circuit that can select among the voltage driving push-pull type single-ended transmission, the current driving type push-pull type differential transmission system, such as LVDS, defining a midpoint potential of a differential signal to be half of the power supply (VDD), and the open-drain type differential transmission system with the use of the same driver circuits. Thus, being free from load capacity of an unnecessary output stage circuit, the bidirectional interface circuit can suppress deterioration of quality of a signal waveform during high-speed signal transmission.

(7) Note that in the interface circuit shown in each of FIGS. 9-14, the input to the driver circuit 201 is delayed due to internal delay caused by the selection circuit S1, compared with the input to the logic circuit C6 included in the output control circuit 410, which causes skew between signals outputted by the signal lines D1p and D1m.

Figure 15:
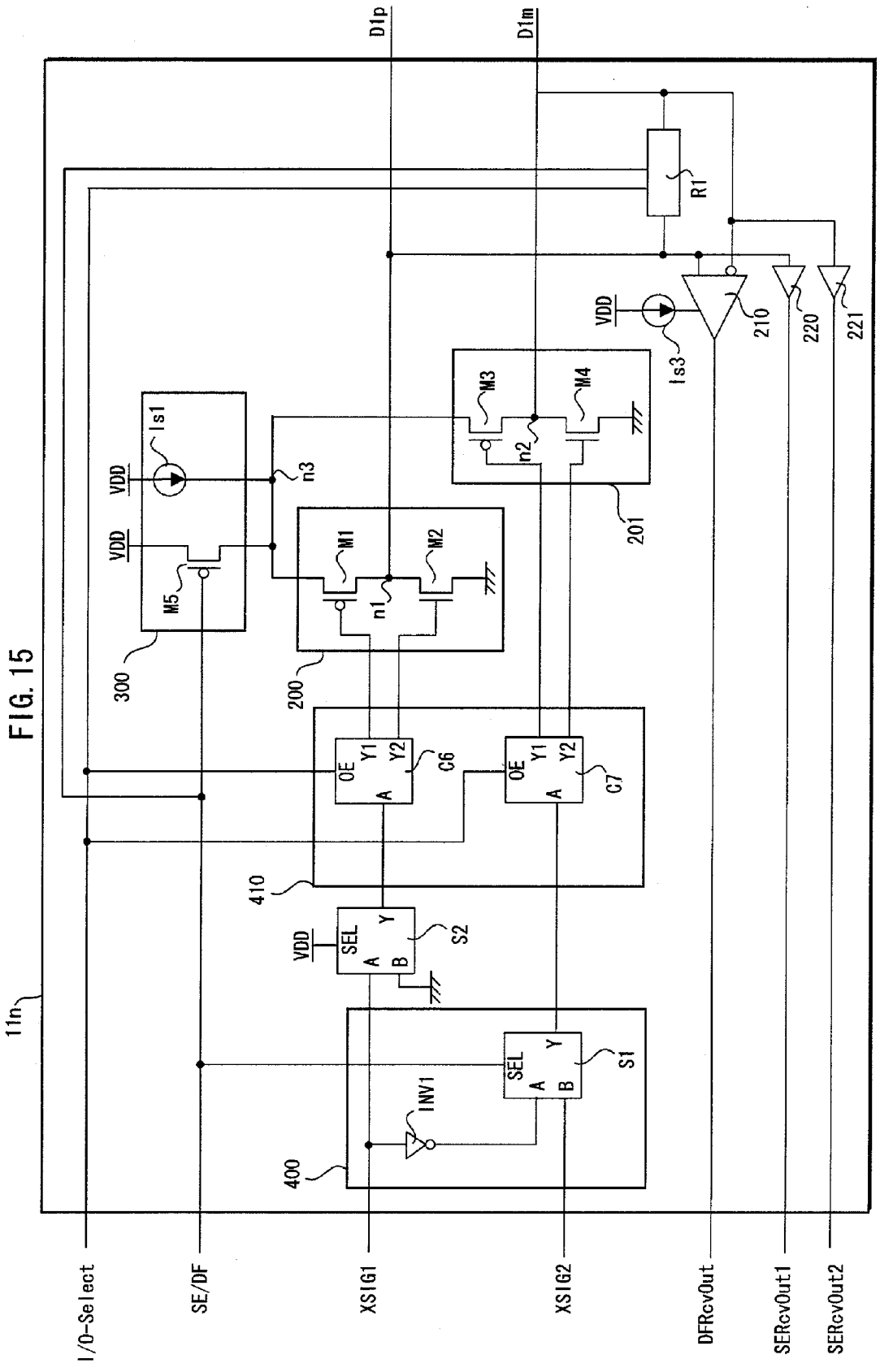
FIG. 15 is a diagram showing an example of a configuration of an interface circuit 11n in accordance with Embodiment 2 of the present invention.

When the interface circuit 11h shown in FIG. 9 is taken as an example, the following is desirable to solve the above problem. Similarly to an interface circuit 11n shown in FIG. 15, it is desirable to provide a dummy of the selection circuit S2 in the preceding stage of the logic circuit C6 and that the logic circuit C6 receives the input signal XSIG1 via the dummy selection circuit S2.

Note that in this case, in order that the dummy selection circuit S2 regularly outputs the input signal XSIG1, an input selection signal SEL of the selection circuit S2 is fixed to the power supply (VDD) or the ground Vss.

Thus, the bidirectional interface circuit is effective in suppressing the skew between the two signals that are outputted to the signal lines D1p and D1m.

Note that even when the dummy selection circuit S2 is used, similarly to the bidirectional interface circuit 11n, due to production errors and the like, propagation delay between the selection circuits S1 and S2 may be skewed. For that reason, instead of the dummy selection circuit S2, the delay control circuit 500 shown in the above FIG. 19 may be used. With this configuration, delay time of a signal outputted to the driver circuit 200 can be accurately controlled.

(8) In each of the bidirectional interface circuits 11L and 11m shown in FIGS. 13 and 14, respectively, other than the delay caused by the selection circuit S1, due to the internal delay in the OR circuits C8 and C9 in the preceding stages of the driver circuits 200 and 201, signal transmission to the pMOS transistors M1 and M3 respectively included in the driver circuits 200 and 201 lags behind the signal transmission to the nMOS transistors M2 and M4. Accordingly, since timing for switching the pMOS transistor is different from timing for switching the nMOS transistor, the waveforms of the signals outputted to the signal lines Dip and Dim are distorted.

Figure 16:
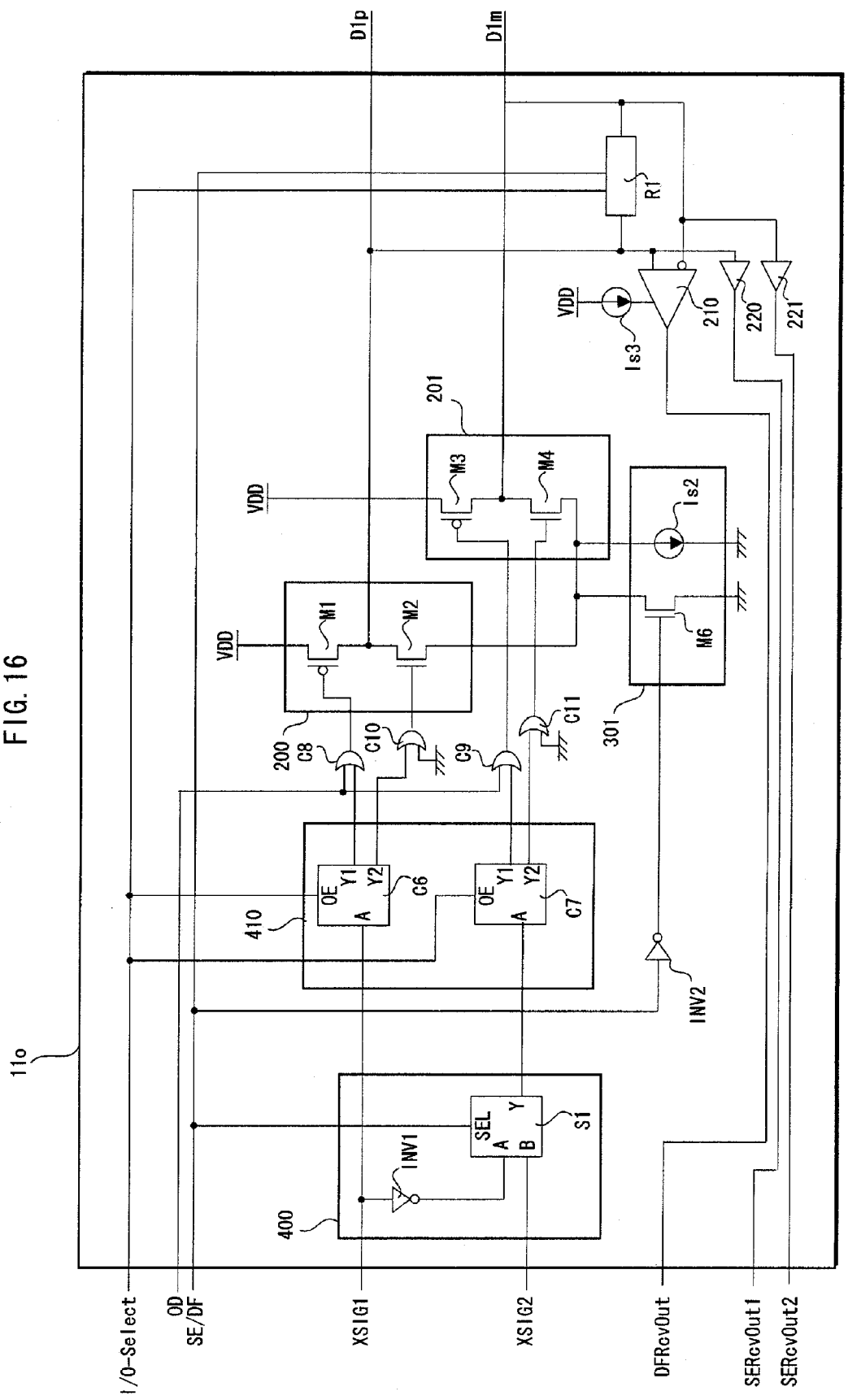
FIG. 16 is a diagram showing an example of a configuration of an interface circuit 11o in accordance with Embodiment 2 of the present invention.

When the interface circuit 11L shown in FIG. 13 is taken as an example, the following is desirable to solve the above problem. Similarly to the interface circuit 11o shown in FIG. 16, it is desirable to set dummy logic circuits C10 and C11 in the preceding stage of the gates of the nMOS transistors M2 and M4. The dummy logic circuit C10 performs OR operation on an output signal outputted from the terminal Y2 of the dummy logic circuit C6 and the ground (potential Vss). The dummy logic circuit C10 outputs a signal obtained by the OR operation, which is always the signal outputted from the terminal Y2 of the logic circuit C6 to the gate of the transistor M2. Similarly to the dummy logic circuit C10, the dummy logic circuit C11 performs the OR operation on the signal outputted from the terminal Y2 of the logic circuit C7 and the ground (potential Vss). The dummy logic circuit C11 outputs a signal obtained by the OR operation, which is always the signal outputted from the terminal Y2 of the logic circuit C7 to the gate of the transistor M4.

Thus, the bidirectional interface circuit is effective in reducing deterioration of the quality of signals outputted to the signal lines D1p and D1m.

(9) Note that for high-speed differential transmission, it is common that the amplitudes of the differential signals going thorough the signal lines D1p and D1m are each approximately hundreds of volts, which is much lower compared with a level (e.g. 3.3 V) of a signal outputted by the differential receiver 210 and used in the logic circuit. Accordingly, to amplify a signal level within the differential receiver, it is necessary to use a current supply circuit.

For that reason, in general, similarly to the bidirectional interface circuit 11h shown in FIG. 9, the current supply circuit Is1 used for outputting a differential signal and the current supply circuit Is3 used for amplifying a received signal by the differential receiver are independently configured. However, similarly to the bidirectional interface circuit 11p shown in FIG. 17, the current supply circuit Is3 may be removed and the current supply circuit Is1 may be connected to the differential receiver 210 via the pMOS transistor M8. That is to say, the output of the current supply circuit Is1 is connected to the source of the transistor M8, and the drain of the transistor M8 is connected to the differential receiver 210. In addition, the I/O system control signal I/O-Select is connected to the gate of the transistor M8.

In the bidirectional interface circuit 11p, when the I/O system control signal I/O-Select is "L," the transistor M8 applies current supplied by the current supply circuit Is1 to the differential receiver 210. Thus, with the configuration of the bidirectional interface circuit 11p shown in FIG. 17, since the current supply circuits used by the interface circuit 11p can be used for outputting and inputting a differential signal, in addition to the effect for suppressing deterioration of quality of a signal thanks to the configuration of the interface circuit 11h shown in FIG. 9, the bidirectional interface circuit 11p is effective in reducing the circuit area.

Figure 17:
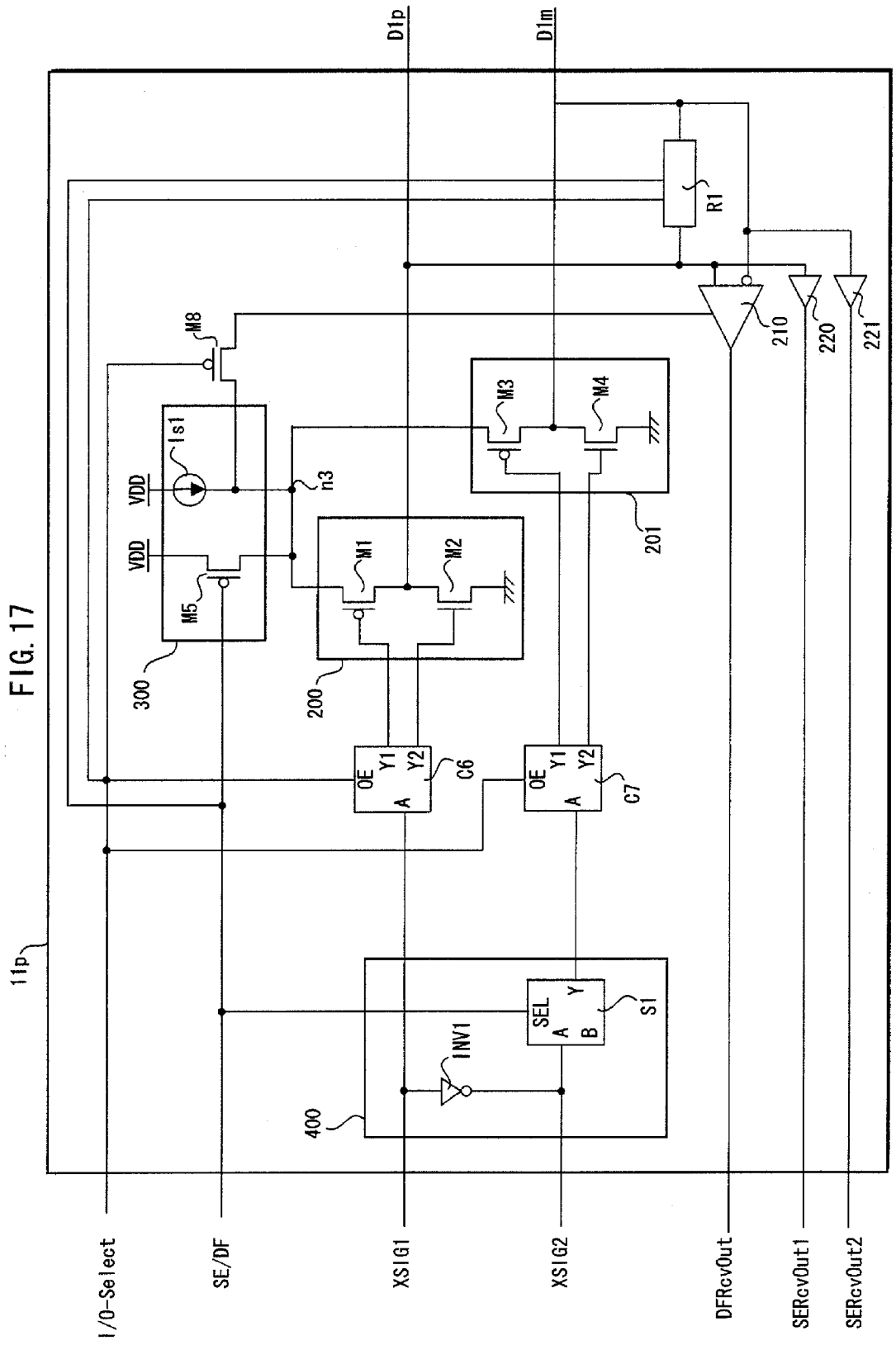
FIG. 17 is a diagram showing an example of a configuration of an interface circuit 11p in accordance with Embodiment 2 of the present invention.

Although the bidirectional interface circuit 11p shown in FIG. 17 is a modification of the bidirectional interface circuit 11h shown in FIG. 9, note that the bidirectional interface circuit 11p is applicable to each of the bidirectional interface circuits shown in FIGS. 10-16. Thus, the same effect can be achieved.

(10) Note that in each of the bidirectional interface circuits shown in FIGS. 9-17, the input signal XSIG1 inputted to the input control circuit 400 may be outputted from a parallel-serial conversion circuit. Thus, a plurality of signals in the LSI internal circuit can be converted to serial signals with the use of the parallel-serial conversion circuit and outputted to the input control circuit 400.

Embodiment 3

Figure 20:
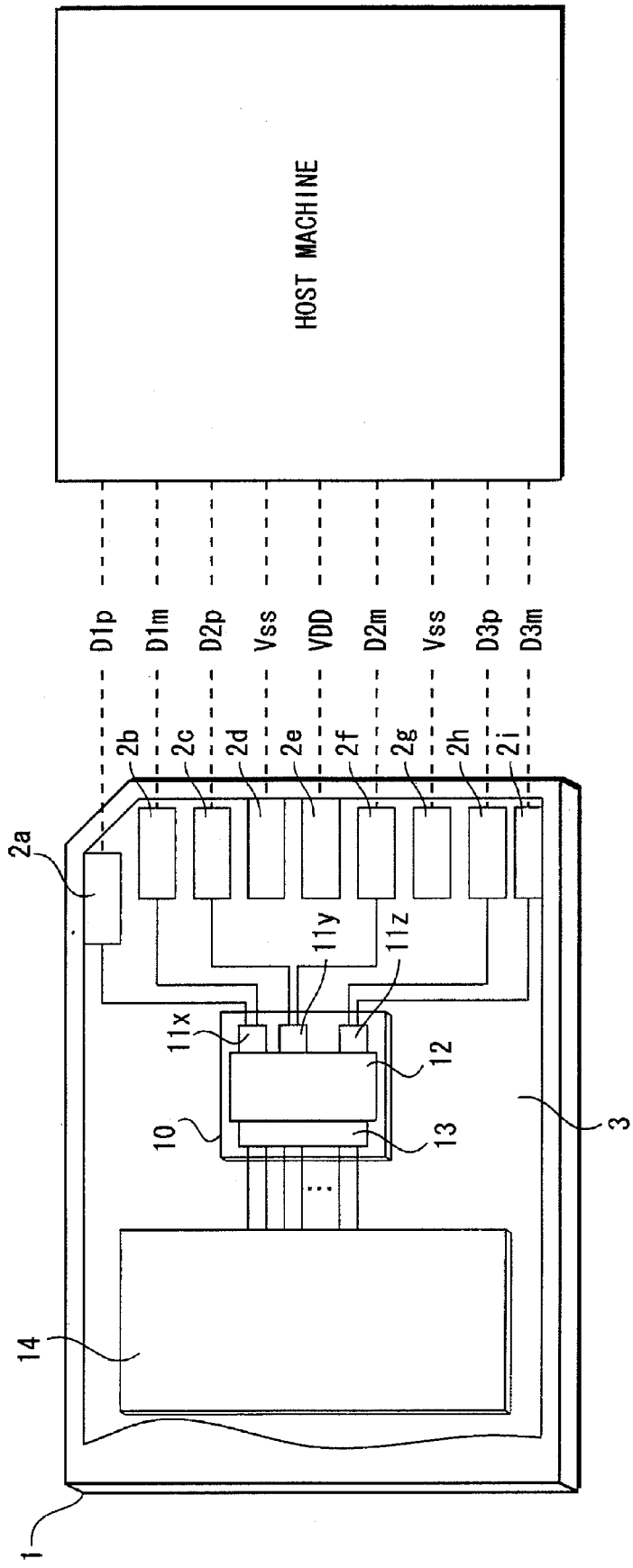
FIG. 20 is a diagram showing an example of a configuration of a removable memory card 1 in accordance with Embodiment 3 of the present invention.

FIG. 20 shows an example of a removable memory card in accordance with Embodiment 3 of the present invention. An interface circuit that can switch between the voltage driving push-pull type single-ended transmission and the current driving type differential transmission is applied to the removable memory card.

As shown in FIG. 20, a removable memory card 1 has a host controller LSI 10, a flash memory 14, and a plurality of external connecting terminal 2a, 2b, and 2i provided on a printed circuit board 3. The host controller LSI 10 has a plurality of interface circuits 11x, 11y and 11z that communicate with a host machine, a logic circuit 12 that performs various kinds of control and processes register information, and a memory interface circuit 13 that communicates with a flash memory.

The removable memory card 1 communicates with the host machine via the external connecting terminal 2a, 2b, . . . and etc. A data signal, a command/response signal, a clock signal and such are transmitted to the signal lines D1p, D1m, D2p, D2m, D3p, and D3m.

When the host machine which is an interface to communicate with the removable memory card 1 is compatible only with single-ended transmission, the interface circuits 11x, 11y, and 11z of the removable memory card 1 perform signal transmission to the host machine with the use of the single-ended transmission.

When the host machine which is an interface to communicate with the removable memory card is compatible with differential transmission, the interface circuits 11x, 11y and 11z are able to perform signal transmission to the host machine with the use of the differential transmission.

Herein, any of the interface circuits 11a, 11b, . . . 11p shown in FIGS. 1-17 disclosed by Embodiments 1 and 2 is applicable to the interface circuit 11x. The same holds for the interface circuits 11y and 11z.

According to Embodiment 3, in the interface circuit 11, the voltage driving push-pull type single-ended transmission and the current driving type differential transmission can be implemented in the same driver circuits, which can suppress the load capacity of the output stage circuits and deterioration of quality of a signal waveform during high-speed signal transmission. Thus, high-speed differential transmission can be performed between the removable memory card and the host machine. In addition, Embodiment 3 is effective in reducing the circuit area, which can suppress the increase in the circuit area of the host controller LSI 10. Accordingly, a large area of the removable memory card 1 can be kept for the flash memory 14 to be mounted thereon, which is effective in enhancing the storage capacity of the removable memory card 1.

Supplement to Embodiment 3

Figure 21:
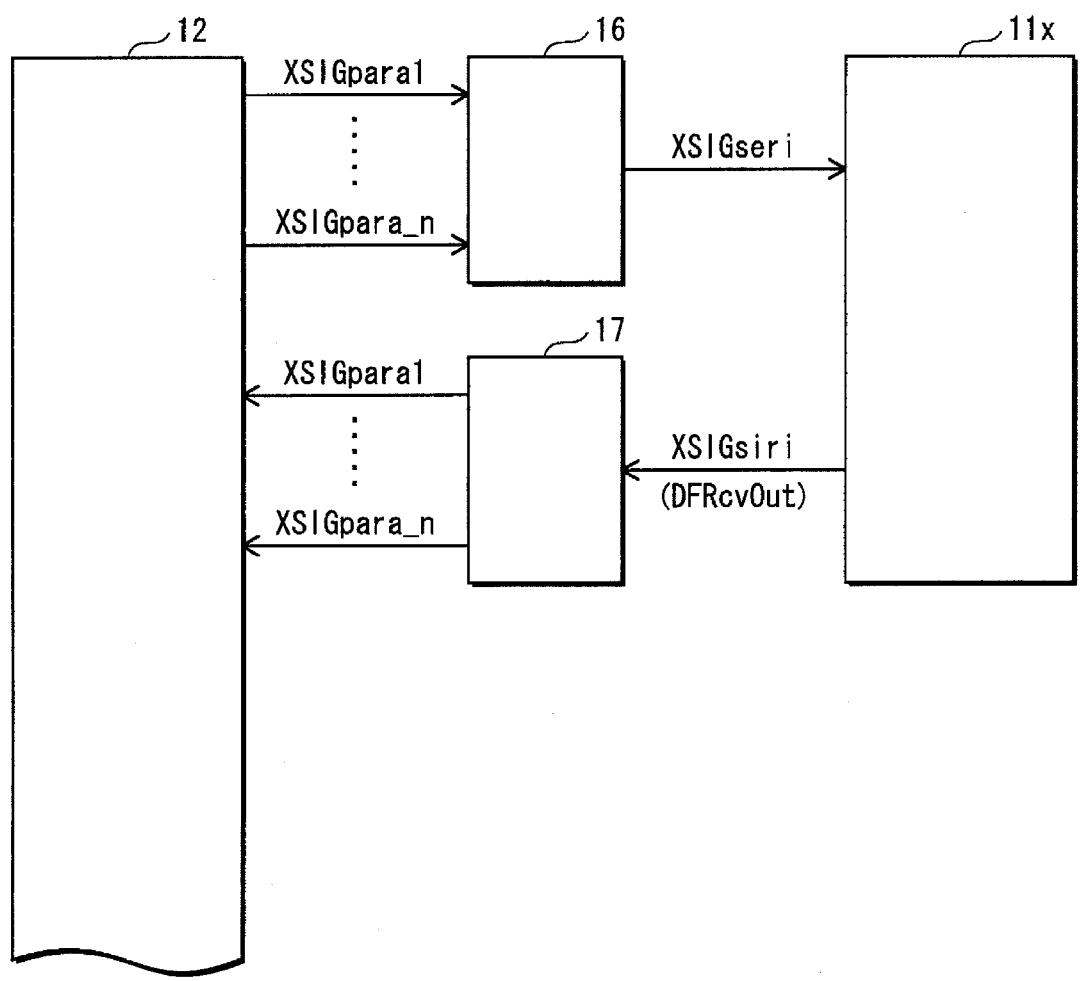
FIG. 21 is an enlarged view of connections between a logic circuit 12 and the interface circuit 11 included in the removable memory card 1.

FIG. 21 shows connections between a logic circuit 12 and an interface circuit 11x included in the removable memory card 1, As shown in FIG. 21, the logic circuit 12 and the interface circuit 11x is connected via a serializer 16 and a deserializer 17.

The logic circuit 12 and the serializer 16 are connected by the number n of signal lines. The logic circuit 12 outputs output signals XSIGpara_1 . . . XSIGpara_n in parallel via the respective signal lines.

The serializer 16 and the interface circuit 11x are connected by one signal line. The serializer 16 sorts the output signals outputted by the logic circuit 12 in serial fashion, and outputs a serial signal XSIGseri (corresponds to XSIG1 and XSIG 2 of Embodiments 1 and 2) to the interface circuit 11x.

The interface circuit 11x and the deserializer 17 are connected by one signal line. The interface circuit 11x outputs a serial signal XSIGsiri (corresponding to DFRcvOUT and SERcvOUT1 or SERcvOUT2 of Embodiment 2).

The deserializer 17 and the logic circuit 12 are connected by the number n of signal lines. The deserializer 17 sorts the serial signal XSIGsiri outputted by the interface circuit 11x in parallel fashion, generates input signals XSIGpara_1 . . . XSIGpara_n, and outputs the input signals generated via the signal lines to the logic circuit 12.

Since connections between the interface circuit 11y and 11z are identical with the above connection, descriptions thereof are omitted.

(Other Modifications)

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

(1) The following describes another example of a device mounting the interface circuit described in Embodiments 1 and 2.

Figure 22:
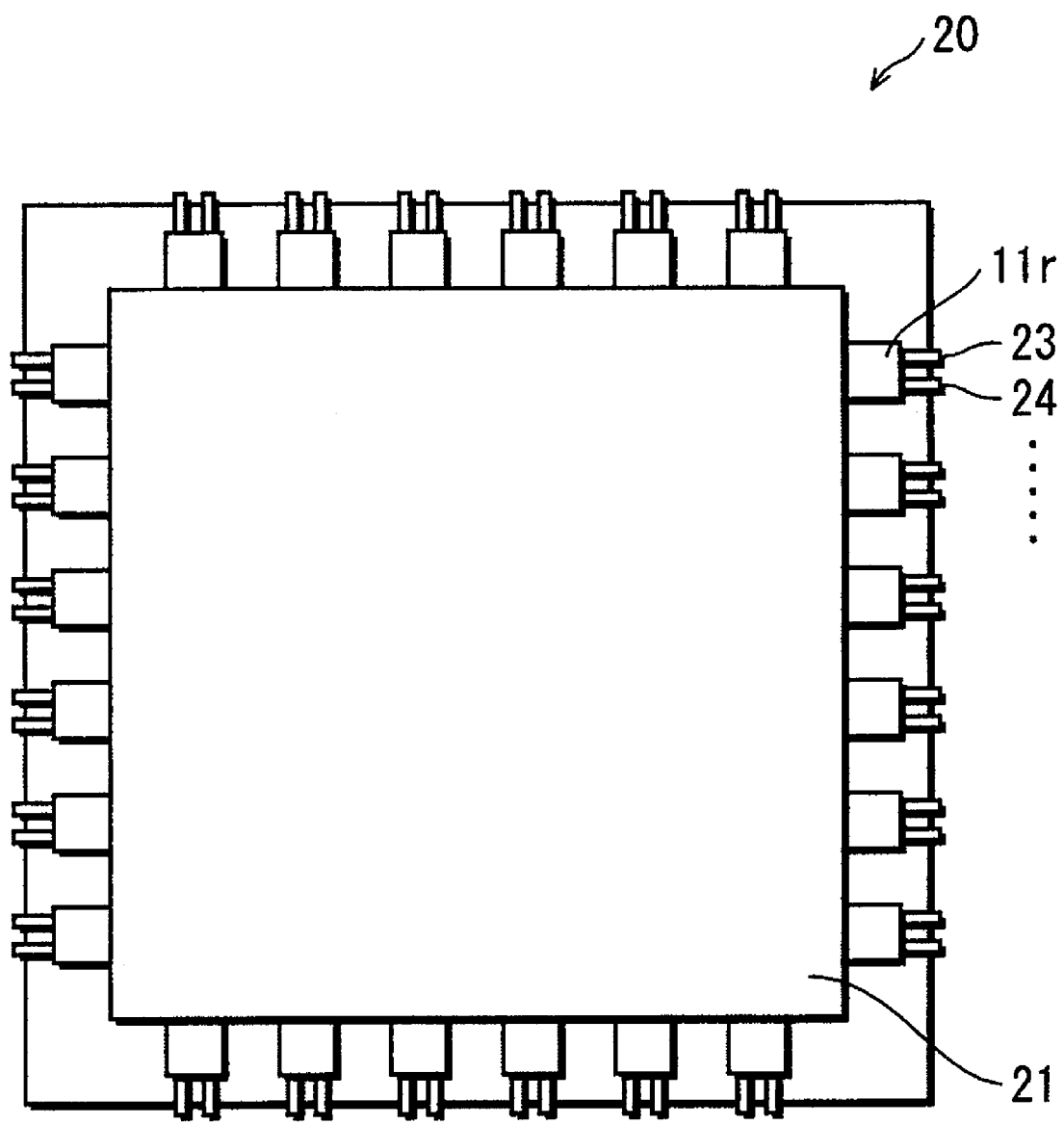
FIG. 22 is a diagram showing a reconfigurable device 20.

FIG. 22 is an external view of a reconfigurable device 20. The reconfigurable device is a circuit that can change a configuration of a logic circuit, and has various types, such as FGPA (Field Programmable Gate Array), PLD (Programmable Logic Device) and PLA (Programmable Logic Array), according to a circuit size and an internal configuration.

The reconfigurable device 20 includes a logic circuit 21 that can change interior functions, a plurality of terminals 23, 24 and etc., and a plurality of interface circuits 11r that connects the terminals and the logic circuits 21. One interface circuit 11r is provided per two terminals.

The interface circuit 11r mediates transmission and reception of signals between the logic circuit 21 and another circuit, according to a transmission system that corresponds to an external device and the other circuit connected to the two terminals of the interface circuit 11r.

(2) The interface circuit of Embodiments 1 and 2, and an electronic device mounting the reconfigurable circuit described as above are also included as embodiments of the present invention.

(Conclusion)

As described above, one embodiment of the present invention relates to an interface circuit as follows. The interface circuit has two driver circuits and a drive control circuit being able to switch between two driving systems that are the voltage driving system and the current driving system. The two driver circuits and the power supply potential are connected via the drive control circuit. Two input signals and inverted logic signals thereof are selectively inputted in the two driver circuits via the selection circuit. The present invention relates to the interface circuit that can switch between the voltage driving type single-ended transmission system and the current driving type differential transmission system with the use of a control signal inputted to the drive control circuit.

With this configuration, the voltage driving type single-ended transmission and the current driving type differential transmission can be implemented in the same driver circuits, which can suppress the load capacity of the output stage circuits and deterioration of quality of a signal waveform during high-speed signal transmission.

In addition, an output stage circuit for the voltage driving type single-ended transmission and an output stage circuit for the current driving type differential transmission can be integrated, which is effective in reducing the circuit area.

With the interface circuit in accordance with the above embodiment of the present invention, the voltage driving push-pull type single-ended transmission and the current driving type push-pull type differential transmission can be implemented in the same driver circuits, which enables the interface circuit not to be influenced by the load capacity of the interface circuit and to suppress deterioration of quality of a signal waveform during high-speed signal transmission. In addition, the output stage circuits of single-ended transmission and differential transmission are integrated, which is effective in reducing the circuit area.

Also, one embodiment of the present invention relates to an interface circuit that performs signal transmission. The interface circuit of the present invention has a first driving circuit and a second driving circuit, a drive control circuit that controls the switch between the voltage driving system and the current driving system, and an input control circuit that controls input to the first and the second driver circuits. The first and the second driver circuits are connected to the power supply potential via the drive control circuit. The input control circuit is connected to an input stage of each of the first and the second driver circuits, and receives a first signal and a second signal. When a third signal is of a first logic level, the input control circuit outputs the first signal to the first driver circuit and the second signal to the second driver circuit. When the third signal is of a second logic level, the input control circuit outputs the first signal to the first driver circuit and an inverted logic signal of the first signal to the second driver circuit. The drive control circuit is characterized as follows. When the third signal is of the first logic level, the first and the second driver circuits are operated by the voltage driving system. When the third signal is of the second logic level, the first and the second driver circuits are operated by the current driving system.

Herein, the drive control circuit may connect the first and the second driver circuits to the ground potential.

Herein, the interface circuit may include a second drive control circuit which is different from said drive control circuit. The second drive control circuit is connected to the first and the second driver circuits and the ground potentials. With the use of the third signal, the first and the second drive control circuits may control each of the first and the second driver circuits to be switched between the voltage driving system and the current driving system.

Herein, the first and the second driver circuits are connected to the power supply potential via a first switch circuit. The first switch circuit may control the connection between each of the first and the second driver circuits and the power supply potential according to the status of the third signal and the fourth signal.

Herein, a circuit that controls an input signal inputted to the first and the second driver circuits are provided in the middle of the input control circuit and the first and the second driver circuits. When the fourth signal is of the first logic level, this circuit outputs the signals outputted from the input control circuit to the first and the second driver circuits. When the fourth signal is of the second logic level, the signals outputted from the input control circuit may be partially limited and be outputted to the second driver circuit.

Herein, a circuit that controls input signals to be inputted to the first and the second driver circuits is provided in the middle of the input control circuit and the first and the second driver circuits. When the fourth signal is of the first logic level, this circuit outputs the signals outputted from the input control circuit to the first and the second driver circuits. When the fourth signal is of the second logic level, the signals outputted from the input control circuit may be partially limited and be outputted to the second driver circuit.

Herein, in addition to the input control circuit, circuits for controlling the delay may be provided in the preceding stages of the first or the second driver, or in the preceding stages of the first and the second driver circuits.

In addition, one embodiment of the present invention relates to an interface circuit that performs signal transmission characterized as follows. The interface circuit has a first driver circuit and a second driver circuit, a drive control circuit that controls the driving system of each of the two driver circuits to be driven with use of the voltage driving system and the current driving system, an input control circuit that controls the input to the first and the second driver circuits, an output control circuit that controls the output to the first and the second driver circuits, a differential receiver circuit, a first single-ended receiver circuit, a second single-ended receiver circuit, and a termination circuit. The first and the second driver circuits are connected to the power supply potential via the drive control circuit. An output node of the first driver circuit is connected to a first signal line, and an output node of the second driver circuit is connected to a second signal line. The input control circuit is connected to the input stage of the output control circuit, and receives the first and the second signals. When a third signal is of a first logic level, the first signal and the second signal are outputted to the output control circuit. When the third signal is of a second logic level, the first signal and the inverted logic signal of the first signal are outputted to the output control circuit. The output control circuit is characterized as follows. When a fifth signal is of the first logic level, the output control circuit controls the output of the first and the second drivers to be at high impedance. When the fifth signal is of the second logic level, the first and the second driver circuits output signals outputted by the input control circuit. When the fifth signal is of the second logic level, signals outputted from the input control circuit are outputted to the first and the second driver circuits. When the third signal is of the first logic level, the drive control circuit drives the first and the second driver circuits with the use of the voltage driving system. When the third signal is of the second logic level, the first and the second driver circuits are operated by the current driving system. One input terminal of the differential receiver circuit is connected to the first signal line, and another input signal of the differential receiver circuit is connected to the second signal line. One input terminal of the differential receiver circuit is connected to the first signal line, and another input terminal of the differential receiver circuit is connected to the second signal line. One end of the termination circuit is connected to the first signal line, and another end of the termination circuit is connected to the second signal line. The first single-ended receiver is connected to the first signal line, and the second single-ended receiver is connected to the second signal line.

Herein, the drive control circuit may connect the first and the second driver circuits to the ground potential.

Herein, the interface circuit may include a second drive control circuit which is different from said drive control circuit. The second drive control circuit is connected to the first and the second driver circuits and the ground potential. The first and the second drive control circuit may control the first and the second driver circuits be driven by the voltage driving system and the current driving system with the use of the third signal.

Herein, the first and the second driver circuits are connected to the power supply potential via the first switch circuit. The first switch circuit may control the connection between each of the first and the second driver circuits and the power supply potential according to the status of the third signal and the fourth signal.

Herein, a circuit that controls input signals to be inputted to the first and the second driver circuits is provided in the middle of the input control circuit and the first and the second driver circuits. When the fourth signal is of the first logic level, this circuit outputs the signals outputted from the input control circuit to the first and the second driver circuits. When the fourth signal is of the second logic level, the signals outputted from the input control circuit may be partially limited and be outputted to the first and the second driver circuits.

Herein, a circuit that controls an input signal to be inputted to the first and the second driver circuits is provided in the middle of the input control circuit and each of the first and the second driver circuits. When the fourth signal is of the first logic level, this circuit outputs the signals outputted from the input control circuit to the first and the second driver circuits. When the fourth signal is of the second logic level, the signals outputted from the input control circuit may be partially limited and be outputted to the first and the second driver circuits.

Herein, in addition to the input control circuit, a first circuit for controlling the delay may be provided in the preceding stage of the first or the second driver circuit. Alternatively, the first circuits may be provided in the preceding stages of the first and the second driver circuits.

Herein, the bidirectional interface circuit may include a second switch circuit. The drive control circuit and the differential receiver are connected to each other via the second switch circuit. When the fifth signal is of the first logic level, the second switch circuit may supply current from the drive control circuit to the differential receiver.

In addition, the present invention relates to a removable memory device characterized by having the above interface circuit.

Furthermore, one embodiment of the present invention may be an interface circuit that relays a signal between a first external circuit and a second external circuit selectively using a single-ended transmission system and a differential transmission system. The interface circuit may include a signal reception unit that receives, from the first external circuit, a system signal indicating either of the single-ended transmission system and the differential transmission system, a first driver circuit and a second driver circuit each of which receives a signal and generates an output signal by selecting a voltage driving system or a current driving system based on the received signal, and outputs the generated output signal to the second external circuit, an input control circuit that receives a first input signal and a second input signal from the first external circuit, and, (i) when the system signal indicates the single-ended transmission system, receives the first input signal and the second input signal from the first external circuit, (ii) when the system signal indicates the differential transmission system, outputs the first input signal to the second driver circuit and an inverted logic signal of the first input signal to the second driver circuit, and a drive control circuit that, (i) when the system signal indicates the single-ended transmission system, controls the first and the second driver circuits to be driven by the voltage driving system, and (i) when the system signal indicates the differential transmission system, controls the first and the second driver circuits to be driven by the current driving system.

The first and the second driver circuits may be connected to a power supply circuit via the drive control circuit. Alternatively, the first and the second driver circuits may be connected to a ground via the drive control circuit Furthermore, the first and the second driver circuits may be connected to a power supply circuit via the drive control circuit. The interface circuit may include a second drive control circuit that, (i) when the system signal indicates the single-ended transmission system, controls the first and the second driver circuits to be driven by the voltage driving system, and (ii) when the system signal indicates the differential transmission system, controls the first and the second driver circuits to be driven by the current driving system. The first and the second driver circuits may be connected to a ground via the second drive control circuit.

Furthermore, the first and the second driver circuits may be connected to a ground via the drive control circuit. The signal reception unit may further receive a control signal. The interface circuit may further includes a first switch circuit that switches between connection and disconnection of each of the first and the second driver circuits to and from the power supply circuit based on the system signal and the control signal.

Furthermore, the first and the second driver circuits may be connected to a ground via the drive control circuit. The signal reception unit may further receive the control signal. The interface circuit may further include a control circuit provided between the first and the second driver circuits. The control circuit may, (i) when the control signal is of a first logic level, output a signal outputted from the input control circuit to the first and the second driver circuits, and (ii) when the control signal is of a second logic level, limit a signal outputted from the input control circuit, and output the limited signal to the first and the second driver circuits.

Furthermore, the interface circuit may include a delay control circuit at a preceding stage of the first and/or the second driver circuits.

Furthermore, one embodiment of the present invention may be a bidirectional interface circuit that relays a signal between a first external circuit and a second external circuit selectively using a single-ended transmission system and a differential transmission system. The interface circuit may include a signal reception unit that receives, from the first external circuit, a system signal indicating either of the single-ended transmission system and the differential transmission system, and a direction signal indicating a transmission direction of a signal, a first driver circuit and a second driver circuit each of which receives a signal, generates an output signal by selecting a voltage driving system or a current driving system, based on the received signal, outputs the generated output signal to the second external circuit, and disconnects from the second external circuit, an input control circuit that receives a first input signal and a second input signal from the first external circuit, (i) when the system signal indicates the single-ended transmission system, outputs the received first and second input signals, and (ii) when the system signal indicates the differential transmission system, outputs the first input signal to the second driver circuit and an inverted logic signal of the first input signal, and an output control circuit that receives, from the input control circuit, (a) the first and the second output signals, or the (b) the first input signal and the inverted logic signal of the first input signal, and (i) when the direction signal indicates transmission to the second external circuit, outputs the received first and the second input signals to the first and the second driver circuits, respectively, or the first input signal and the inverted logic signal to the first and the second driver circuits, respectively, (ii) when the system signal indicates reception from the second external circuit, controls the first and the second driver circuits to kill a connection with the second external circuit, a drive control circuit that, (i) when the system signal indicates the single-ended transmission system, controls the first and the second driver circuits to be driven by a voltage driving system, and (i) when the system signal indicates the differential transmission system, controls the first and the second driver circuits to be driven by a current driving system, a termination resistance circuit that (i) when the system signal indicates the differential transmission system and when the direction signal indicates the reception from the second external circuit, connects at one end to a first signal line connecting the first driver circuit with the second external circuit, and at another end to a second signal line connecting the second driver circuit with the second external circuit, a differential receiver circuit that receives differential signals from the second external circuit via the first and the second signal lines, a first single-ended receiver circuit that receives a single-ended signal from the second external circuit via the first signal line, and a second single-ended receiver circuit that receives a single-ended signal from the second external circuit via the second signal line.

Furthermore, in the bidirectional interface circuit, the first and the second driver circuits may be connected to a power supply circuit via the drive control circuit. Alternatively, the first and the second driver circuits may be connected to a ground via the drive control circuit.

Furthermore, the first and the second driver circuits may be connected to the power supply circuit via the drive control circuit. The bidirectional interface circuit may include a second drive control circuit that, (i) when the system signal indicates the single-ended transmission system, controls the first and the second driver circuits to be driven by the voltage driving system, and (ii) when the system signal indicates the differential transmission system, controls the first and the second driver circuits to be driven by the current driving system. The first and the second driver circuits may be connected to a ground via the second drive control circuit.

Furthermore, the first and the second driver circuits may be connected to a ground via the drive control circuit. The signal reception unit may further receive a control signal. The interface circuit may further includes a first switch circuit that switches between connection and disconnection of each of the first and the second driver circuits to and from the power supply circuit based on the system signal and the control signal.

Furthermore, the first and the second driver circuits may be connected to a ground via the drive control circuit. The signal reception unit may further receive the control signal. The interface circuit may further include a control circuit between the input control circuit and the first and the second driver circuits. The control circuit may, (i) when the control signal is of a first logic level, output a signal outputted from the input control circuit to the first and the second driver circuits, and (ii) when the control signal is of a second logic level, partially limit the signal outputted from the input control circuit, and output the limited signal to the first and the second driver circuits.

Furthermore, the interface circuit may include a delay control circuit at a preceding stage of the first and/or the second driver circuits.

The bidirectional interface circuit may further include a second switch circuit that, when the direction signal indicates the reception from the second external circuit, establishes connection between the drive control circuit and the differential receiver circuit and supplies current from the drive control circuit to the differential receiver circuit.

One embodiment of the present invention is a removable memory device characterized by having the interface circuit or the bidirectional interface circuit.

INDUSTRIAL APPLICABILITY

The present invention is useful for improving the transmission speed and reducing the area of an interface circuit that can switch between the voltage driving push-pull type single-ended transmission and the current driving type differential transmission. In addition, the interface circuit is particularly useful as an interface circuit of a removable memory card that can switch between the voltage driving push-pull type single-ended transmission and the current driving type differential transmission.

What is claimed is:

1. An interface circuit that relays a signal between a first external circuit and a second external circuit selectively using a single-ended transmission system and a differential transmission system, the interface circuit comprising:

a signal reception unit operable to receive, from the first external circuit, a system signal indicating either of the single-ended transmission system and the differential transmission system;

an input control circuit operable, (i) when the system signal indicates the single-ended transmission system, to receive a first data signal and a second data signal from the first external circuit, and to output the first data signal and the second data signal as a first input signal and a second input signal, respectively, and (ii) when the system signal indicates the differential transmission system, to receive a third data signal from the first external circuit, and to output the third data signal and an inverted logic signal of the third data signal as the first and the second input signals, respectively;

a first driver circuit operable to receive the first input signal, to generate a first output signal based on the received first input signal, and to output the first output signal to the second external circuit;

a second driver circuit operable to receive the second input signal, to generate a second output signal based on the received second input signal, and to output the second output signal to the second external circuit; and a drive control circuit operable to select a constant-voltage driving system or a constant-current driving system according to the system signal, and to control, according to the selection, voltage and current that are supplied from a power supply to the first and the second driver circuits, wherein the first driver circuit switches between conduction and non-conduction states of the current supplied from the power supply according to a level of the first input signal so as to generate the first output signal, the second driver circuit switches between conduction and non-conduction states of the current according to a level of the second input signal so as to generate the second output signal, the signal reception unit further receives, from the first external circuit, a direction signal indicating a transmission direction, and the interface circuit further comprises:

a first signal line and a second signal line operable to establish connections between the first driver circuit and the second external circuit and between the second driver circuit and the second external circuit, respectively;

an output control circuit operable to receive the first and the second input signals from the input control circuit, and (i) when the direction signal indicates the transmission direction from the first external circuit to the second external circuit, to output the first and the second input signals to the first and the second driver circuits, respectively, (ii) when the direction signal indicates the transmission direction from the second external circuit to the first external circuit, to disconnect the input control circuit from the second external circuit;

a termination resistance circuit connected at one end to the first signal line and at another end to the second signal line, the termination resistance circuit having a given resistance value;

a differential receiver circuit operable to receive differential signals from the second external circuit via the first and the second signal lines;

a first single-ended receiver circuit operable to receive a single-ended signal from the second external circuit via the first signal line; and a second single-ended receiver circuit operable to receive a single-ended signal from the second external circuit via the second signal line.

2. The interface circuit of claim 1, further comprising:

a receiver switch circuit operable, when the direction signal indicates the transmission direction from the second external circuit to the first external circuit, to establish a connection between the drive control circuit and the differential receiver circuit, and to supply current from the drive control circuit to the differential receiver circuit.

* * * * *